US011004246B1

(12) United States Patent
Cheng et al.

(10) Patent No.: US 11,004,246 B1
(45) Date of Patent: May 11, 2021

(54) JEWELRY GENERATION SERVICES

(71) Applicant: 2238534 ONTARIO INC., North York (CA)

(72) Inventors: Stan Cheng, Toronto (CA); Anthony Davis, Toronto (CA); Schuyler Jager, Toronto (CA); Homa Esmaili, Toronto (CA)

(73) Assignee: 2238534 ONTARIO INC., North York (CA)

( * ) Notice: Subject to any disclaimer, the term of this patent is extended or adjusted under 35 U.S.C. 154(b) by 0 days.

(21) Appl. No.: 16/421,083

(22) Filed: May 23, 2019

Related U.S. Application Data

(60) Provisional application No. 62/675,332, filed on May 23, 2018.

(51) Int. Cl.
*G06T 11/60* (2006.01)
*G06F 30/00* (2020.01)
*G06F 3/0482* (2013.01)
*G06T 11/20* (2006.01)

(52) U.S. Cl.
CPC ............ *G06T 11/60* (2013.01); *G06F 3/0482* (2013.01); *G06F 30/00* (2020.01); *G06T 11/203* (2013.01)

(58) Field of Classification Search
CPC ... G06Q 30/0621; G06T 11/00; G06T 11/203; G06T 11/60; G06F 30/00; G06F 3/0482
See application file for complete search history.

(56) References Cited

U.S. PATENT DOCUMENTS

| | | | | |
|---|---|---|---|---|
| 2005/0114157 A1* | 5/2005 | Moskowitz | ............ | G06Q 30/02 715/760 |
| 2005/0171866 A1* | 8/2005 | Herbert | .............. | G06Q 30/0621 705/26.5 |
| 2008/0177410 A1* | 7/2008 | Carbonera | .............. | B44B 1/006 700/98 |
| 2009/0030804 A1* | 1/2009 | Sell | .................... | G06Q 30/0621 705/26.5 |

OTHER PUBLICATIONS

Zou, C., Cao, J., Ranaweera, W., Alhashim, I., Tan, P., Sheffer, A., Zhang, H. 2016. Legible Compact Calligrams, ACM Trans. Graph. 35, 4, Article 122 (Jul. 2016), 12 pages. DOI=10.1145/2897824. 2925887, http://doi.acm.org/10.1145/2897824.2925887 (Year: 2016).*
"Chapter 5: Document Structure", https://www.w3.org/TR/SVG2/struct.html#Groups, retrieved on May 21, 2019, 45 pages.
"Draft—Chapter 5: Document Structure", https://svgwg.org/svg2-draft/struct.html#IDAttribute, retrieved on May 21, 2019, 43 pages.
"Family Tree Cutout Necklace", https://www.jewlr.com/products/JWLN0415/sterling-silver-family-tree-cutout-necklace?ch=, retrieved on May 23, 2019, 4 pages.
"Family Tree Cutout Necklace", https://www.jewlr.com/products/JWLN0415/sterling-silver-family-tree-cutout-necklace?e1=Ashley &e2=Daniel&e3=Wendy&e4=Janelle&ch=, retrieved on May 23, 2019, 4 pages.

(Continued)

*Primary Examiner* — Diane M Wills
(74) *Attorney, Agent, or Firm* — Van Court & Aldridge LLP

(57) ABSTRACT

Systems, methods, and computer-readable media for a jewelry generation service are provided.

20 Claims, 18 Drawing Sheets

(56) References Cited

OTHER PUBLICATIONS

"Line" https://developer.mozilla.org/en-US/docs/Web/SVG/Element/line, Aug. 22, 2018, 5 pages.
"Monogram Name Pendant", https://www.jewlr.com/products/JWLN0301/sterling-silver-monogram-name-pendant?ch=&a1=, retrieved on May 23, 2019, 4 pages.
"Paths", https://developer.mozilla.org/en-US/docs/Web/SVG/Tutorial/Paths, Apr. 19, 2019, 11 pages.
"Personalized Name Necklace", https://www.jewlr.com/products/JWLN0300/sterling-silver-personalized-name-necklace?a1=Butterfly&ch=, retrieved on May 23, 2019.
"Personalized Name Necklace", https://www.jewlr.com/products/JWLN0300/sterling-silver-personalized-name-necklace?ch=, retrieved on May 23, 2019, 4 pages.
"Stylized Name Necklace", https://www.jewlr.com/products/JWLN0325/sterling-silver-stylized-name-necklace?ch=, retrieved on May 23, 2019, 4 pages.

\* cited by examiner

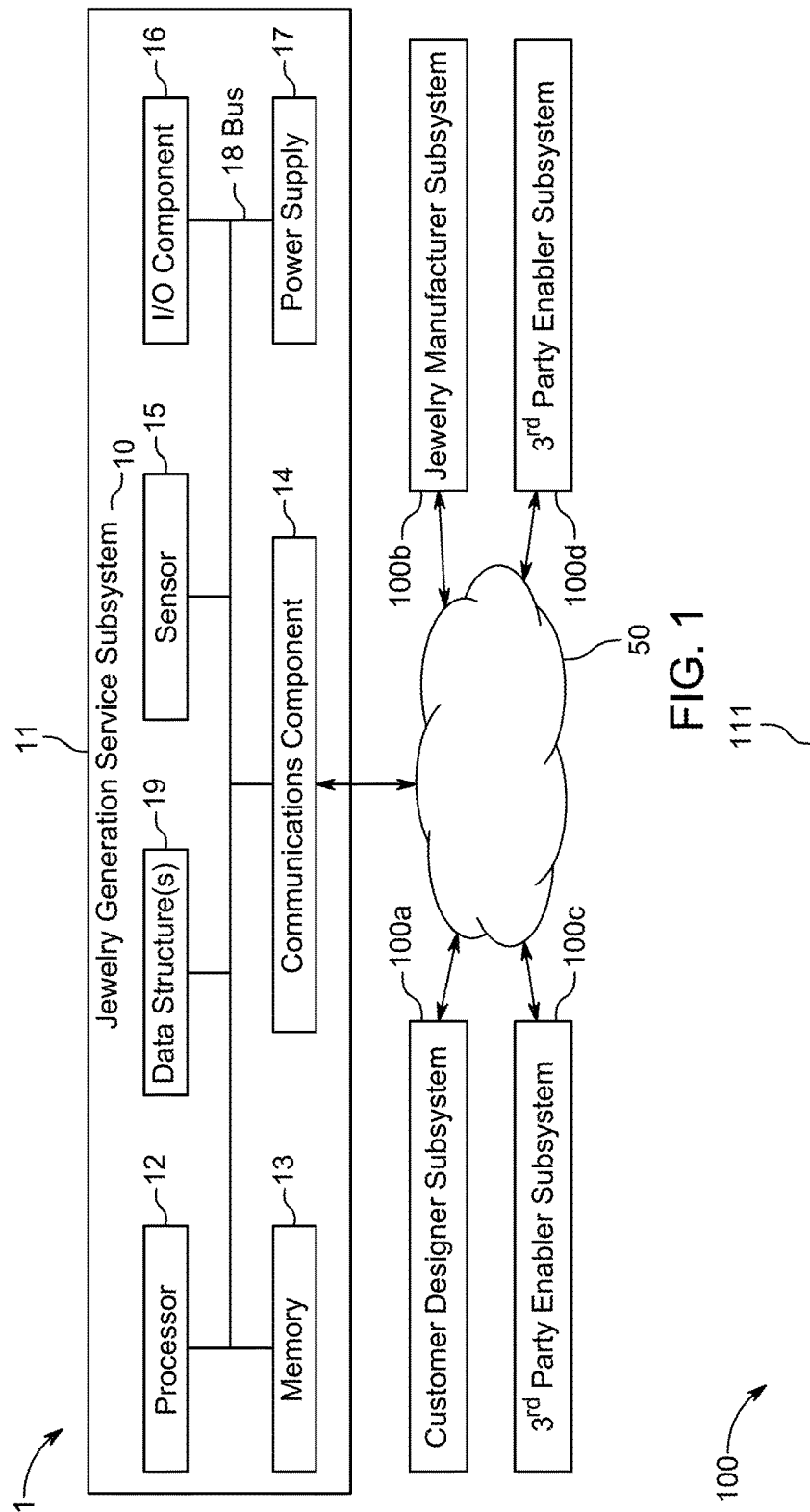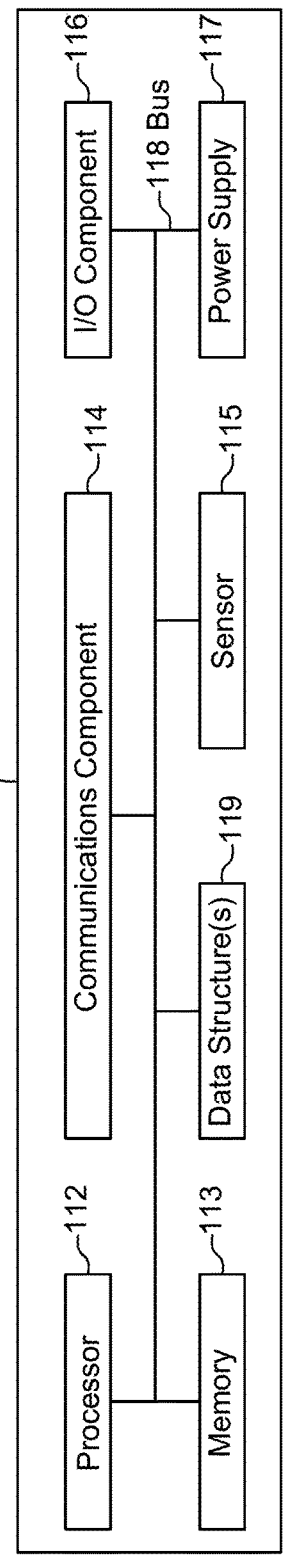

JEWELRY GENERATION SERVICES

CROSS-REFERENCE(S)

This application claims the benefit of prior filed U.S. Provisional Patent Application No. 62/675,332, filed May 23, 2018, which is hereby incorporated by reference herein in its entirety.

FIELD

This generally relates to jewelry generation services and, more particularly, to jewelry generation services for providing an instant real time view of a piece of personalized laser cut jewelry.

BACKGROUND

Name necklaces and other personalized jewelry have been a popular gift category for many decades. Initially, name necklaces were purchased at jewelry stores and hand made by using saw blades to cut name patterns from sheets of silver or gold. With the rise in popularity, lasers began to be used to cut the name patterns. With the growth in ecommerce, the availability of these items increased dramatically, and the price of items dropped due to increased competition. A challenge, however, has been for a consumer to see in advance exactly how its name is going to appear when the custom item is physically delivered. During the online shopping experience, a majority of web sites may simply present one or, perhaps, a couple of different sample items using one or two names. This gives the consumer a very broad idea of what font is being used without specifically showing exactly how the consumer's name (or names) will actually appear. The problem is compounded when dealing with items that have complex paths, charms, shapes, and/or embedded names.

SUMMARY

Systems, methods, and computer-readable media for personalizing jewelry generation services are provided.

For example, a method for generating a personalized jewelry item is provided that may include, for a jewelry style type, receiving, at a server subsystem, from a user electronic device, user device data indicative of a plurality of user-selected letters, in response to the receiving, automatically generating, at the server subsystem, a vector graphics jewelry image of a personalized jewelry item design that includes the plurality of user-selected letters integrated into a shape of the jewelry style type while satisfying a plurality of manufacturing constraints associated with the jewelry style type, after the automatically generating, automatically enabling, with the server subsystem, a presentation of a visual representation of the generated vector graphics jewelry image by the user electronic device, and, after the automatically generating, producing a physical representation of the generated vector graphics jewelry image.

As another example, a non-transitory computer-readable storage medium may be provided for storing at least one program, the at least one program including instructions, which when executed by at least one processor of a server subsystem, may cause the server system to, for a jewelry style type, receive, at the server subsystem, from a user electronic device, user device data indicative of a plurality of user-selected letters, in response to receiving the user device data, automatically generate, at the server subsystem, a vector graphics jewelry image of a personalized jewelry item design that includes the plurality of user-selected letters integrated into a shape of the jewelry style type while satisfying a plurality of manufacturing constraints associated with the jewelry style type, after generating the vector graphics jewelry image, automatically enable, with the server subsystem, a presentation of a visual representation of the generated vector graphics jewelry image by the user electronic device, and, after enabling the presentation, produce a physical representation of the generated vector graphics jewelry image.

As yet another example, a server system is provided that may include a memory, a communications component, and a processor communicatively coupled to the memory and the communications component, the processor configured to for a jewelry style type, receive, via the communications component, from a user electronic device, user device data indicative of a plurality of user-selected letters, in response to receiving the user device data, automatically generate a vector graphics jewelry image of a personalized jewelry item design that includes the plurality of user-selected letters integrated into a shape of the jewelry style type while satisfying a plurality of manufacturing constraints associated with the jewelry style type, after generating the vector graphics jewelry image, automatically enable a presentation of a visual representation of the generated vector graphics jewelry image by the user electronic device, and, after enabling the presentation, produce a physical representation of the generated vector graphics jewelry image.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 1 is a schematic view of an illustrative system for a jewelry generation service of the disclosure;

FIG. 1A is a more detailed schematic view of a client subsystem of the system of FIG. 1;

DETAILED DESCRIPTION

Figure 2:
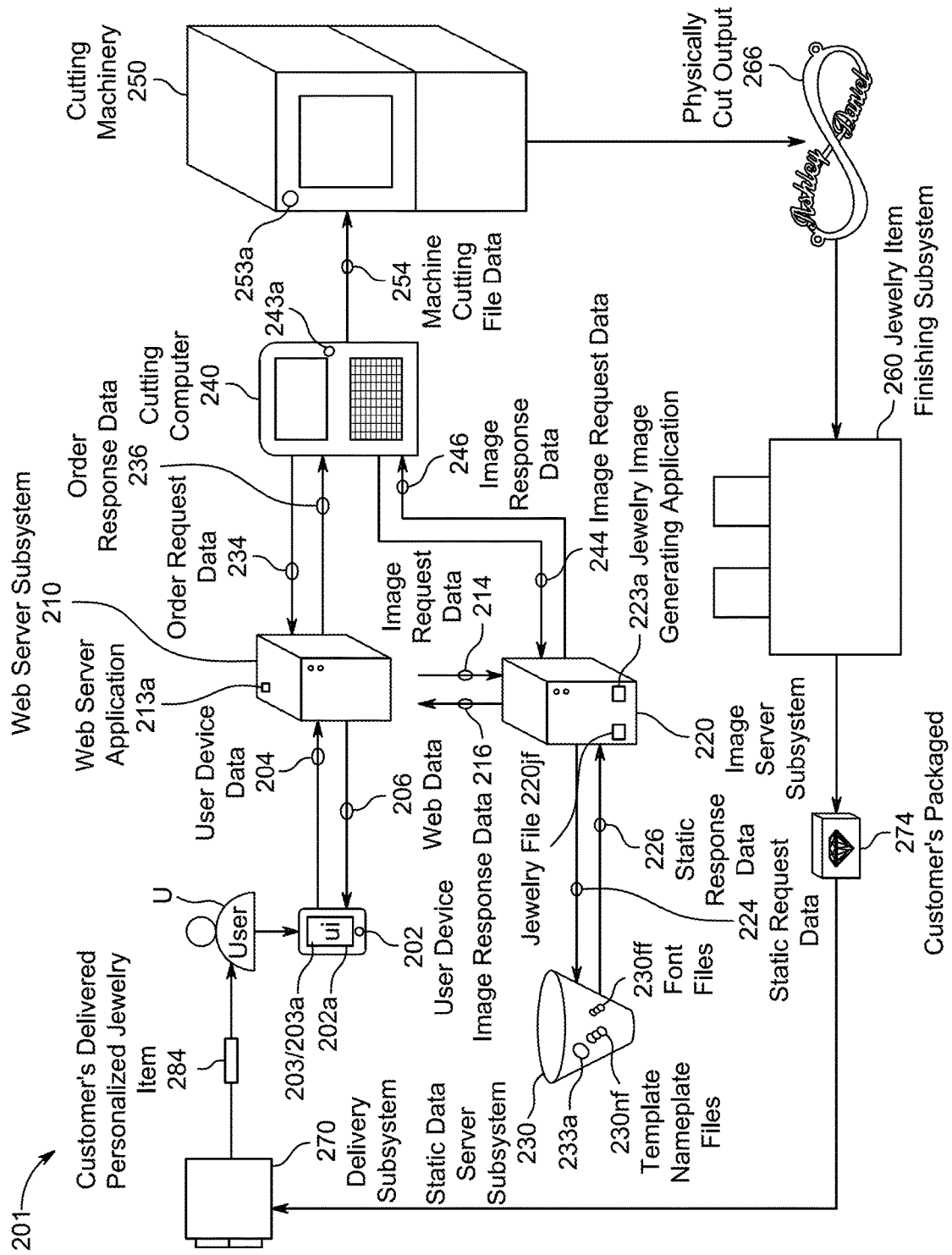
FIG. 2 is a schematic view of another illustrative system for a jewelry generation service of the disclosure.

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

A jewelry generation service is provided that may enable a consumer to choose, via an online or other suitable user interface (e.g., graphical user interface ("GUI")) of a user electronic device, a design for personalizing a jewelry item (e.g., necklace, ring, bracelet, earring, etc.), which may include one or more personalized text elements contained within or along or at least partially in place of one or more shapes (e.g., plates) that may be adorned with one or more embellishments (e.g., chains, hanging charms, gemstones, etc.). Each time the consumer chooses to update a design element (e.g., text element characteristic (e.g., letter(s), font size, font type, etc.), plate type, embellishment type, etc.) of the consumer's design for the personalized jewelry item (e.g., during an online or otherwise live personalization session), the jewelry generation service may create and present to the consumer, via the online or other suitable user interface of the user electronic device, an instant or near-instant real time visual representation (e.g., image(s) or other view(s) displayed by the user electronic device) of the consumer's chosen design for the personalized jewelry item (e.g., as an online or otherwise live preview). The real time visual presentation of the consumer's chosen design for the personalized jewelry item may be created algorithmically to satisfy any aesthetic requirements and/or any structural constraints that may exist for manufacturing (e.g., laser cutting) a physical representation of the consumer's chosen design for the personalized jewelry item. Once the consumer finally accepts a particular chosen design, the visual representation (e.g., exact imagery) presented to the consumer for that chosen design may then be used as input(s) to a laser cutter or any other suitable manufacturing assembly in order to manufacture and deliver a physical representation of the consumer's chosen design for the personalized jewelry item that may exactly match the presented visual representation of the consumer's chosen design for the personalized jewelry item.

FIG. 1 is a schematic view of an illustrative system 1 in which a jewelry generation service may be facilitated amongst various entities. For example, as shown in FIG. 1, system 1 may include a jewelry generation service ("JGS") subsystem 10, various subsystems 100 (e.g., at least one consumer or customer designer ("CD") subsystem 100a, at least one jewelry manufacturer ("JM") subsystem 100b, and/or one or more third party enabler ("TPE") subsystems 100c and 100d), and at least one communications network 50 through which any two or more of the subsystems 10 and 100 may communicate. JGS subsystem 10 may be operative to interact with any of the various subsystems 100 to provide a jewelry generation service platform ("JGSP") of system 1 that may facilitate various jewelry generation services, including, but not limited to, enabling consumers to choose design elements for personalizing jewelry items via electronic device user interfaces while presenting, substantially in real time to the consumers, visual representations of the chosen designs via electronic device user interfaces and/or using such visual representations to manufacture physical representations of the chosen designs that may exactly match the visual representations.

As shown in FIG. 1A, and as described in more detail below, a subsystem 100 may include a processor component 112, a memory component 113, a communications component 114, a sensor component 115, an input/output ("I/O") component 116, a power supply component 117, and/or a bus 118 that may provide one or more wired or wireless communication links or paths for transferring data and/or power to, from, or between various other components of subsystem 100. I/O component 116 may include at least one input component (e.g., a button, mouse, keyboard, microphone, etc.) to receive information from a user of subsystem 100 and/or at least one output component (e.g., an audio speaker, visual display, haptic component, etc.) to provide information to a user of subsystem 100, such as a touch screen that may receive input information through a user's touch on a touch sensitive portion of a display screen and that may also provide visual information to a user via that same display screen. Memory 113 may include one or more storage mediums, including for example, a hard-drive, flash memory, permanent memory such as read-only memory ("ROM"), semi-permanent memory such as random access memory ("RAM"), any other suitable type of storage component, or any combination thereof. Communications component 114 may be provided to allow one subsystem 100 to communicate with a communications component of one or more other subsystems 100 or subsystem 10 or servers using any suitable communications protocol (e.g., via communications network 50). Communications component 114 can be operative to create or connect to a communications network for enabling such communication. Communications component 114 can provide wireless communications using any suitable short-range or long-range communications protocol, such as Wi-Fi (e.g., an 802.11 protocol), Bluetooth, radio frequency systems (e.g., 1200 MHz, 2.4 GHz, and 5.6 GHz communication systems), infrared, protocols used by wireless and cellular telephones and personal e-mail devices, or any other protocol supporting wireless communications. Communications component 114 can also be operative to connect to a wired communications network or directly to another data source wirelessly or via one or more wired connections or a combination thereof. Such communication may be over the internet or any suitable public and/or private network or combination of networks (e.g., one or more networks 50). Sensor 115 may be any suitable sensor that may be configured to sense any suitable data from an external environment of subsystem 100 or from within or internal to subsystem 100 (e.g., light data via a light sensor, audio data via an audio sensor, location-based data via a location-based sensor system (e.g., a global positioning system ("GPS")), etc.). Power supply 117 can include any suitable circuitry for receiving and/or generating power, and for providing such power to one or more of the other components of subsystem 100. Subsystem 100 may also be provided with a housing 111 that may at least partially enclose one or more of the components of subsystem 100 for protection from debris and other degrading forces external to subsystem 100. Each component of subsystem 100 may be included in the same housing 111 (e.g., as a single unitary device, such as a laptop computer or portable media device) and/or different components may be provided in different housings (e.g., a keyboard input component may be provided in a first housing that may be communicatively coupled to a processor component and a display output component that may be provided in a second housing, and/or multiple servers may be communicatively coupled to provide for a particular subsystem). In some embodiments, subsystem 100 may include other components not combined or included in those shown or several instances of the components shown.

Processor 112 may be used to run one or more applications, such as an application that may be provided as at least a part of one data structure 119 that may be accessible from memory 113 and/or from any other suitable source (e.g., from JGS subsystem 10 via an active internet connection). Such an application data structure 119 may include, but is not limited to, one or more operating system applications, firmware applications, communication applications, internet browsing applications (e.g., for interacting with a website provided by JGS subsystem 10 for enabling subsystem 100 to interact with an online service of JGS subsystem 10 (e.g., a JGSP)), JGS applications (e.g., a web application or a native application or a hybrid application that may be at least partially produced by JGS subsystem 10 for enabling subsystem 100 to interact with an online service of JGS subsystem 10 (e.g., a JGSP)), or any other suitable applications. For example, processor 102 may load an application data structure 119 as a user interface program to determine how instructions or data received via an input component of I/O component 116 or via communications component 114 or via sensor component 115 or via any other component of subsystem 100 may manipulate the way in which information may be stored and/or provided to a user via an output component of I/O component 116 and/or to any other subsystem via communications component 114. As one example, an application data structure 119 may provide a user (e.g., consumer) with the ability to interact with a jewelry generation service or the JGSP of JGS subsystem 10, where such an application 119 may be a third party application that may be running on subsystem 100 (e.g., an application associated with JGS subsystem 10 that may be loaded on subsystem 100 from JGS subsystem 10 or via an application market) and/or that may be accessed via an internet application or web browser running on subsystem 100 (e.g., processor 112) that may be pointed to a uniform resource locator ("URL") whose target or web resource may be managed by JGS subsystem 10 or any other remote subsystem. One, some, or each subsystem 100 may be or include a portable media device (e.g., a smartphone), a laptop computer, a tablet computer, a desktop computer, an appliance, a wearable electronic device, a virtual reality device, at least one web or network server (e.g., for providing an online resource, such as a website or native online application, for presentation on one or more other subsystems) with an interface for an administrator of such a server, and/or the like.

JGS subsystem 10 may include a housing 11 that may be similar to housing 111, a processor component 12 that may be similar to processor 112, a memory component 13 that may be similar to memory component 113, a communications component 14 that may be similar to communications component 114, a sensor component 15 that may be similar to sensor component 115, an I/O component 16 that may be similar to I/O component 116, a power supply component 17 that may be similar to power supply component 117, and/or a bus 18 that may be similar to bus 118. Moreover, JGS subsystem 10 may include one or more data sources or data structures or applications 19 that may include any suitable data or one or more applications (e.g., any application similar to application 119) for facilitating a jewelry generation service or JGSP that may be provided by JGS subsystem 10 in conjunction with one or more subsystems 100. Some or all portions of JGS subsystem 10 may be operated, managed, or otherwise at least partially controlled by an entity (e.g., administrator) responsible for providing a jewelry generation service to one or more clients or other suitable entities.

JGS subsystem 10 may communicate with one or more subsystems 100 via communications network 50. Network 50 may be the internet or any other suitable network, such that when intercoupled via network 50, any two subsystems of system 1 may be operative to communicate with one another (e.g., a subsystem 100 may access information (e.g., from a data structure 19 of JGS subsystem 10, as may be provided as a jewelry generation service via processor 12 and communications component 14 of JGS subsystem 10) as if such information were stored locally at that subsystem 100 (e.g., in memory component 113)).

Various clients and/or partners may be enabled to interact with JGS subsystem 10 for enabling the jewelry generation services and the JGSP. For example, at least one customer designer subsystem 100a of system 1 may be operated by any suitable customer designer ("CD") client to choose and update any suitable design elements for personalizing a jewelry item (e.g., necklace, ring, bracelet, earring, etc.), which may include one or more personalized text elements contained within or along one or more shapes (e.g., plates) that may be adorned with one or more embellishments (e.g., chains, hanging charms, gemstones, etc.). CD subsystem 100a may be any suitable device or computing system that may be operative to provide any suitable user interface with which a CD may interact to choose and/or update a design for a personalized jewelry item and/or at which the CD may be provided with a presentation of a visual representation of the design for the personalized jewelry item. For example, CD subsystem 100a may be any suitable electronic device or system, including, but not limited to, a portable media device (e.g., a smartphone), a laptop computer, a tablet computer, a desktop computer, an appliance, a wearable electronic device, a virtual reality device, at least one web or network server (e.g., for providing an online resource, such as a website or native online application, for presentation on one or more other subsystems), and/or the like. For example, CD subsystem 100a may be a customer designer's personal smartphone or laptop computer that may be operative to interact with the JGCP of JGS subsystem 10 (e.g., via network 50) for providing any suitable services to the customer designer. As another example, CD subsystem 100a may be at least a portion of a JGS subsystem 10 (e.g., a kiosk at a shopping mall) that may provide any number of different CDs with an interface for choosing a design and being presented with a visual representation. A CD may be any suitable entity with a purpose to design a personalized jewelry item, either for itself or for someone else (e.g., another end user).

At least one jewelry manufacturer subsystem 100b of system 1 may be operated by any suitable jewelry manufacturer ("JM") client to manufacture a physical representation of the consumer's chosen design for the personalized jewelry item that may exactly match the visual representation of the consumer's chosen design for the personalized jewelry item. JM subsystem 100b may be any suitable device or computing system that may be operative to manipulate one type of file into another (e.g., a cutting computer that may manipulate a scalable vector graphics ("SVG") file into an AutoCAD drawing interchange format or drawing exchange format ("DXF") file or a file of any other suitable format and/or any suitable final cutting forms) and/or any suitable plate cutting machine (e.g., any suitable machine that may be operative to cut one or more plates into one or more cut designs using any suitable file(s) and/or form(s) (e.g., any suitable DXF(s) and/or final cutting form(s) from a cutting computer)) and/or any suitable jewelry item finishing machine(s) (e.g., any suitable machine(s) that may be operative to attach embellishment(s) (e.g., chains, hanging charms, gemstones, etc.) to a cut design and/or to polish a jewelry item and/or to package a jewelry item and/or the like). As another example, one or more third party enabler subsystems, such as subsystems 100c and 100d, may be operated by any suitable third party enabler ("TPE") clients to enable at least partially any suitable operation provided by the JGSP, such as a third party application or service provider that may be operative to process or provide any suitable subject matter (e.g., financial institutions that may provide any suitable financial information or credit scores or transmit or receive payments of any suitable party, social networks that may provide any suitable connection information between various parties or characteristic data of one or more parties, licensing bodies, third party advertisers, owners of relevant data, sellers of relevant goods/materials, software providers, providers of web servers and/or cloud storage services, package delivery providers, and/or any other suitable third party service provider that may be distinct from a JM and JGS subsystem 10).

Each subsystem 100 of system 1 (e.g., each one of subsystems 100a-100d) may be operated by any suitable entity for interacting in any suitable way with JGS subsystem 10 (e.g., via network 50) for deriving value from and/or adding value to a service of the JGSP of JGS subsystem 10. For example, a particular subsystem 100 may be a server operated by a client entity that may receive any suitable data from JGS subsystem 10 related to any suitable enhancement service of the JGSP provided by JGS subsystem 10 (e.g., via network 50). Additionally or alternatively, a particular subsystem 100 may be a server operated by a client entity that may upload or otherwise provide any suitable data to JGS subsystem 10 related to any suitable enhancement service of the JGSP provided by JGS subsystem 10 (e.g., via network 50).

One particular system that may be similar to system 1 may be provided by system 201 of FIG. 2. As shown, system 201 may include a customer designer or user U that may be enabled to use any suitable CD subsystem or customer or user electronic device 202, which may be similar to CD subsystem 100a. As shown in FIG. 2, user device 202 may be a handheld electronic device, such as an iPhone™ by Apple Inc., that may include any suitable input components, output components, and/or I/O components through which user device 202 and user U may interface with each other. For example, an I/O component 202a, which may be similar to an I/O component 116 of CD subsystem 100a, may be provided by device 202 and may include a display output component and an associated touch input component or other suitable input component, where I/O component 202a may be used to display a visual or graphic user interface ("GUI") 203, which may allow user U to interact with device 202. GUI 203 may include various layers, windows, screens, templates, elements, menus, and/or other components of a currently running client application 203a, such as a computer application, web application, native application, hybrid application, web site browser, and/or the like (e.g., an application data structure 119 of CD subsystem 100a), that may be displayed in all or some of the areas of a display output component of I/O component 202a.

As shown in FIGS. 3-5B, user device 202 may be configured to display various screens 300-500B with one or more graphical elements of GUI 203, which may be specific examples of such displays of GUI 203 during use of a JGS client application 203a on device 202 by user U for designing and being presented with a visual representation of a design for a personalized jewelry item. Each screen of such a GUI may include various user interface elements. For example, as shown, each one of screens 300-500B may include any suitable user selectable options, such as respective options 301, 401, 501a, and 501b, which may include user selectable options for defining any suitable characteristics of a jewelry item, including, but not limited to, plate type (e.g., monogram name pendant, family tree cutout necklace, stylized name necklace, personalized name necklace, etc.), name or text element characteristics (e.g., letter(s) (e.g., name: "Ashley"), font size (e.g., 15, 16, 17, etc.), font type (e.g., Courier New, Times New Roman, Arial, etc.), and/or the like), material(s) (e.g., sterling silver, gold, etc.), embellishment characteristics (e.g., charm option(s) (e.g., butterfly) and/or chain option(s) and/or gemstone options and/or the like), packaging options (e.g., box options), shipping options, billing options, and/or the like. Such characteristics or values or parameters or variables, which may affect the appearance of the jewelry item, may have any suitable default setting(s) but may be adjusted for a particular design chosen by user U through interaction with GUI 203 and shared with a remote web server or any suitable subsystem(s) that may run any suitable jewelry generating algorithm(s) of the JGSP. Additionally, as shown, each one of screens 300-500B may include any suitable visual representation of the design of the jewelry item being personalized, such as respective visual representations 321, 421, 521a, and 521b, which may include a static image or a rotating 3-dimensional set of images or video clip or the like, that may be indicative of the consumer's chosen design for the personalized jewelry item as it will look when manufactured into a physical representation of the design. Additionally, as shown, in some embodiments, one, some, or each one of screens 300-500B may include any suitable visual representation options for such a visual representation, such as respective visual representation options 321o, 421o, 521ao, and 521bo, which may include two or more (e.g., user-selectable) types of visual representations to be utilized for providing the visual representation (e.g., a visual representation of the design in space, a visual representation of the design in close-up around a user's neck, multiple visual representations of the design at different angles and/or different sides thereof (e.g., front and back), a visual representation of the design around a user's neck with different length chains, etc.). Additionally, as shown, each one of screens 300-500B may include any suitable uniform resource locator ("URL") information, such as respective URL listings 341, 441, 541a, and 541, which may be updated to reflect the personalization of the jewelry item associated with the particular GUI screen (e.g., when GUI 203 is provided by a web browser application 203a). Additionally or alternatively, various other types of visual and/or non-visual (e.g., haptic, audible, etc.) information may be provided to a user via various other output components of device 202. The operations described with respect to various GUIs may be achieved with a wide variety of graphical elements and visual schemes. Therefore, the described embodiments are not intended to be limited to the precise user interface conventions adopted herein. Rather, embodiments may include a wide variety of user interface styles.

System 201 may also include a web server subsystem 210 that may be communicatively coupled to user device 202 (e.g., via any suitable network 50 and/or any suitable wired or wireless communications path) for receiving any suitable user device data 204 from user device 202 and/or for transmitting any suitable web data 206 to user device 202. Web server subsystem 210 may be provided by any suitable subsystem (e.g., JGS subsystem 10) that may be operative to at least partially manage or otherwise control or instruct a JGS application providing GUI 203 to user U (e.g., JGS client application 203a of device 202). For example, web server subsystem 210 may provide for the operation of any suitable website (e.g., jewlr.com) or of any suitable application, such as a JGS web server application 213a (e.g., an application data structure 19 of JGS subsystem 10), that may communicate using any suitable protocol(s) with JGS client application 203a that may be running on or otherwise accessed by user device 202 to provide the JGSP to user U. User device data 204 may be any suitable data that may be generated by and/or communicated from user device 202 to web server subsystem 210 (e.g., from application 203a to application 213a) for enabling a user to interact with the JGSP. For example, user device data 204 may include, but is not limited to, data indicative of any suitable user selections of any suitable design elements for a jewelry item being personalized (e.g., text element characteristic(s) (e.g., letter(s), font size, font type, etc.), plate type(s), embellishment type(s), material type(s), element length(s), etc. of the consumer's design for the personalized jewelry item) and/or user payment information and/or user shipping information for any selected purchases and/or the like that may be received by and/or otherwise defined by GUI 203 (e.g., selection(s) as may be made by user U through interacting with GUI 203 of device 202 in any suitable way (e.g., drop down menus, text entry, radio button selection, etc.) during an online or otherwise live or interactive personalization session with the JGSP (e.g., as URL query parameters)). Web data 206 may include, but is not limited to, data indicative of any suitable details of a jewelry item being personalized by a user and/or visual representation(s) of the personalized jewelry item and/or payment options and/or shipping options and/or the like that may be generated by and/or communicated from web server subsystem 210 to user device 202 (e.g., from application 213a to application 203a) for providing GUI 203 and enabling a user to interact with the JGSP. Therefore, any suitable algorithm(s) and/or processes may be carried out by the JGSP for providing any of the jewelry generation services described herein, where one, some, or all of the processes described herein may be implemented by software, but may also be implemented in hardware, firmware, or any combination of software, hardware, and firmware (e.g., by a JGS subsystem (e.g., by JGS subsystem 10 and provided to CD subsystem 100a, or by web server subsystem 210 (e.g., alone or in combination with one or more of subsystems 220 and 230), such as by using application 213a, and then provided to user device 202) or by a JGS subsystem in combination with a CD subsystem (e.g., by JGS subsystem 10 in combination with CD subsystem 100a, or by web server subsystem 210 (e.g., alone or in combination with one or more of subsystems 220 and 230) in combination with user device 200, where application 203a and 213a may together (e.g., alone or in combination with any suitable jewelry image generating application(s) of any other suitable subsystems (e.g., application(s) 223a of subsystem 220)) carry out any of the algorithm(s) and/or processes of the JGSP described herein)).

System 201 may also include an image server subsystem 220 that may be communicatively coupled to web server subsystem 210 (e.g., via any suitable network 50 and/or any suitable wired or wireless communications path) for receiving any suitable image request data 214 from web server subsystem 210 and/or for transmitting any suitable image response data 216 to web server subsystem 210. Image server subsystem 220 may be provided by any suitable subsystem (e.g., JGS subsystem 10) that may be operative to automatically generate one or more visual representations of a design for a personalized jewelry item (e.g., an item that may be designed at least partially based on any suitable selections made by user U of device 202 through interfacing with GUI 203 of the JGSP and shared with image server subsystem 220 via web server subsystem 210). For example, image server subsystem 220 may be operative to run any suitable jewelry image generating application 223a (e.g., an application that may utilize any suitable jewelry generating algorithms) for use in automatically creating a customized jewelry computer vector graphics image (e.g., a customized and/or merged jewelry image file 220jf), where such an image may be used for presenting a visual representation of a personalized jewelry design to a user (e.g., via a GUI 203 on device 202 (e.g., in a preview mode (e.g., via data 216 and data 206))) and/or for generating a physical representation of the personalized jewelry design to be delivered to an end user (e.g., via any suitable delivery subsystem (e.g., a delivery subsystem 270)). Image request data 214 may be any suitable data that may be generated by and/or communicated from web server subsystem 210 to image server subsystem 220 (e.g., from application 213a to application 223a) that may be indicative of any suitable characteristics or values or parameters or variables for a chosen design for the personalized jewelry item (e.g., any suitable design elements for a jewelry item being personalized (e.g., text element characteristic(s) (e.g., letter(s), font size, font type, etc.), plate type(s), embellishment type(s), material type(s), element length(s), etc. of the consumer's design for the personalized jewelry item)). Image response data 216 may be any suitable data that may be generated by and/or communicated from image server subsystem 220 to web server subsystem 210 (e.g., from application 223a to application 213a) that may be indicative of a customized jewelry computer graphics image (e.g., a customized and/or merged jewelry image file 220jf), where such an image may be used by web server subsystem 210 for presenting a visual representation of a personalized jewelry design to a user (e.g., via a GUI 203 on device 202 (e.g., in a preview mode (e.g., via data 206)) and/or for use in generating a physical representation of the personalized jewelry design to be delivered to an end user. In some embodiments, such a customized jewelry computer graphics image (e.g., a customized and/or merged jewelry image file 220jf) may be provided to web server subsystem 210 (e.g., as at least a portion of data 216) in the form of an SVG file and/or JSON data or in the format of a PNG or JPEG or TIFF or any other suitable file format to which an SVG file may be converted for use in presenting a visual representation of the customized jewelry computer graphics image to user U via GUI 203. Alternatively, in some embodiments, web server subsystem 210 may be configured to receive and then convert an SVG file to such another format. Alternatively, in some embodiments, web server subsystem 210 may be configured to receive and pass such an SVG file to user device 202 (e.g., as at least a portion of data 206), and device 202 may be configured to receive and then convert such an SVG file to another format (e.g., a PNG or JPEG or TIFF) for use in presenting a visual representation on GUI 203.

System 201 may also include a static data server subsystem 230 that may be communicatively coupled to image server subsystem 220 (e.g., via any suitable network 50 and/or any suitable wired or wireless communications path) for receiving any suitable static request data 224 from image server subsystem 220 and/or for transmitting any suitable static response data 226 to image server subsystem 220. Static data server subsystem 230 may be provided by any suitable subsystem (e.g., JGS subsystem 10 or TPE subsystem 100) that may be operative to store any suitable number of template nameplate source files (e.g., file(s) 230nf) and/or any suitable number of font files (e.g., file(s) 230ff), any of which may be selectively loaded by and used by image server subsystem 220 for automatically creating a customized jewelry computer graphics image (e.g., a customized and/or merged jewelry image file 220jf). For example, static data server subsystem 230 may be operative to run any suitable data server application 233a for use in managing and/or storing and/or sharing any suitable nameplate source files 230nf and/or any suitable font files 230ff and/or the like. Static request data 224 may be any suitable data that may be generated by and/or communicated from image server subsystem 220 to static data server subsystem 230 (e.g., from application 223a to application 233a) that may be indicative of any suitable nameplate source file(s) and/or any suitable font file(s) requested for use by application 223a (e.g., for automatically creating a customized jewelry computer graphics image (e.g., a customized and/or merged jewelry image file 220jf)). Static response data 226 may be any suitable data that may be generated by and/or communicated from static data server subsystem 230 to image server subsystem 220 (e.g., from application 233a to application 223a) that may be indicative of any suitable (e.g., requested) nameplate source file(s) 230nf and/or font file(s) 230ff.

System 201 may also include a cutting subsystem that may include any suitable cutting computer 240 and any suitable cutting machinery 250. As shown, cutting computer 240 may be communicatively coupled to web server subsystem 210 (e.g., via any suitable network 50 and/or any suitable wired or wireless communications path) for transmitting any suitable order request data 234 to web server subsystem 210 and/or for receiving any suitable order response data 236 from web server subsystem 210. Additionally or alternatively, as shown, cutting computer 240 may be communicatively coupled to image server subsystem 220 (e.g., via any suitable network 50 and/or any suitable wired or wireless communications path) for transmitting any suitable image request data 244 to image server subsystem 220 and/or for receiving any suitable image response data 246 from image server subsystem 220. Additionally or alternatively, as shown, cutting computer 240 may be communicatively coupled to cutting machinery 250 (e.g., via any suitable network 50 and/or any suitable wired or wireless communications path) for transmitting any suitable machine cutting file data 254 to cutting machinery 250. Cutting computer 240 may be provided by any suitable subsystem (e.g., JGS subsystem 10 and/or JM subsystem 100b) that may be operative to automatically manipulate or convert or otherwise utilize any received image file data for providing a machine cutting file to cutting machinery 250. For example, cutting computer 240 may be operative to run any suitable cutting computer application 243a for use in requesting and obtaining any suitable customized and/or merged jewelry image file 220jf (e.g., from web server subsystem 210 as at least a portion of response data 236 (e.g., in response to an appropriate request of request data 234) and/or from image server subsystem 220 as at least a portion of response data 246 (e.g., in response to an appropriate request of request data 244)) and then converting that jewelry image file 220jf into a format suitable for use as a machine cutting file by cutting machinery 250 to manufacture a physical representation of the design of that jewelry image file 220jf (e.g., manipulating an SVG file into a DXF file or a file of any other suitable format and/or any suitable final cutting forms), where that suitable machine cutting file may be communicated as at least a portion of data 254 to cutting machinery 250. As one example, an operator of cutting computer 240 may have a physical stack of "job bags" that may be scanned by a barcode scanner or otherwise and may be sent in the form of a web request (e.g., as at least a portion of order request data 234) to web server subsystem 310, and web server subsystem 210 may prepare a list of products based on such a request, where such a list may include links (e.g., URLs) to designs provided by the JGSP, and may return such a list to cutting computer 240 (e.g., as at least a portion of order response data 236), which may then be used by cutting computer 240 to request the jewelry image file(s) associate with the designs of that list (e.g., as at least a portion of image request data 244), and in response to such a request image server subsystem 230 may return such requested jewelry image file(s) (e.g., as at least a portion of image response data 246), which may be files in the form of SVGs and JSON data. Alternatively, such files may be provided to cutting computer 240 directly from web server subsystem 210. Cutting machinery 250 may be any suitable machinery (e.g., plate cutting machine) that may be operative to receive any suitable jewelry image file 220jf in any suitable format (e.g., SVG, DXF, PNG, JPEG, TIFF, etc.) and then use that jewelry image file 220jf as a machine cutting file for cutting a material in a particular manner for manufacturing a physically cut output 266 that is a physical representation of the design for the personalized jewelry item associated with jewelry image file 220jf. For example, cutting machinery 250 may be operative to run any suitable cutting machinery application 253a for use in receiving and utilizing any suitable jewelry image file 220jf (e.g., from cutting computer 240 (e.g., as at least a portion of data 254)) for manufacturing physically cut output 266. Therefore, in response to any new user design choice that may be received by the JGSP (e.g., via user device 202), a particular jewelry image file 220jf may be automatically generated (or updated) based on that new user design choice and then immediately used to present a visual representation of that user design to a user via a GUI 203 (e.g., in an online preview mode), and that particular jewelry image file 220jf may also be used to manufacture a physically cut output 266 for providing a physical representation of that same user design.

System 201 may also include a jewelry item finishing subsystem 260 that may be operative to receive and utilize physically cut output 266 to finish the manufacture of the customer's personalized jewelry item, such as by prying and poking out any cut material from physically cut output 266 (e.g., the cut material in the hole within a cut letter "e" and/or the cut material in the hole within a cut eyelet and/or the like), attaching any chains and/or charms and/or other suitable embellishments, polishing any suitable portions of the jewelry item, packaging the jewelry item, and/or the like, which may result in a customer's packaged personalized jewelry item 274 (e.g., a jewelry item including physically cut output 266). In some embodiments, system 201 may also include a delivery subsystem 270 that may be operative to receive and then deliver packaged personalized jewelry item 274 to an appropriate end user (e.g., user U) as a customer's delivered personalized jewelry item 284 that may include physically cut output 266 as at least a portion of a physical representation of the consumer's chosen design for the personalized jewelry item that may exactly match a presented visual representation of the consumer's chosen design for the personalized jewelry item.

Any suitable portions of system 201 may be provided by any suitable entities. For example, user device 202 may be similar to or provided by a customer designer subsystem 100a or may be provided as a portion of a JGS subsystem (e.g., as a user interface portion of JGS subsystem 10 (e.g., as a self-contained kiosk that may be provided at a store or the like). Each one of web server subsystem 210, image server subsystem 220, and static data server subsystem 230 may be managed and/or provided by different entities, or, alternatively, any two or each of subsystems 210, 220, and 230 may be provided by a JGS subsystem (e.g., as JGS subsystem 10). Alternatively, subsystems 210 and 220 may be provided by a JGS subsystem (e.g., JGS subsystem 10) while subsystem 230 may be provided by a TPE subsystem (e.g., TPE subsystem 100c, which may be, for example, a cloud storage server, such as an Amazon S3 bucket as a public cloud storage resource available in Amazon Web Services' ("AWS") Simple Storage Service ("S3"), an object storage offering, and/or the like, where such buckets may be the same as or similar to file folders, store objects, which may include any suitable data and its descriptive metadata). Each one of cutting computer 240, cutting machinery 250, and manufacturing machinery 260 may be managed and/or provided by different entities, or, alternatively, any two or each one of cutting computer 240, cutting machinery 250, and/or manufacturing machinery 260 may be provided by a JMS subsystem (e.g., as JMS subsystem 100b). Alternatively, computer 240 may be provided as at least a portion of a JGS subsystem (e.g., JGS subsystem 10) while machinery 250 and machinery 260 may be provided by one JMS subsystem (e.g., as JMS subsystem 100b) or as distinct JMS subsystems. Shipping subsystem 270 may be managed and/or provided by a JMS subsystem (e.g., JMS subsystem 100b) or by a TPE subsystem (e.g., TPE subsystem 100d, which may be, for example, any suitable delivery service provider subsystem (e.g., a Federal Express delivery subsystem or the like)).

The JGSP of system 1 and/or of system 201 and/or the like may enable a consumer to update a design element (e.g., text element characteristic (e.g., letter(s), font size, font type, etc.), plate type, embellishment type, etc.) of a consumer's design for a personalized jewelry item using any suitable electronic device user interface (e.g., during an online or otherwise live personalization session) and the JGSP may then create and present to the consumer, via the online or other suitable electronic device user interface, an instant or near-instant real time visual representation (e.g., image(s)) of the consumer's chosen design for the personalized jewelry item (e.g., as an online or otherwise live preview). The real time visual presentation of the consumer's chosen design for the personalized jewelry item may be created algorithmically by the JGSP (e.g., by any suitable jewel generating algorithm(s) (e.g., algorithm(s) that may be utilized by jewelry image generating application 223a that may be run at least partially by image server subsystem 220 (e.g., in conjunction with subsystem 210 and/or subsystem 220 and/or user device 202))) to meet any aesthetic requirements and/or any structural constraints that may exist for manufacturing (e.g., laser cutting) a physical representation of the consumer's chosen design for the personalized jewelry item (e.g., a visual presentation may define the tool path that may be used by a laser cutter to produce the physical representation). The JCSP may be configured to use any suitable algorithm(s) and/or carry out any suitable processes automatically (e.g., in real-time or substantially real-time) to create a visual representation of a chosen design that may satisfy any suitable manufacturing constraints, where such automatic creation and presentation of such a visual representation may provide a significantly effective and efficient user experience as compared to requiring a manufacturer to determine, at least partially manually (e.g., using vector graphic products) in a time consuming manner, the shape of a jewelry item that not only satisfies manufacturing constraints but also the personalized design choices of the user. For example, such automatic creation may enable the JCSP to present a visual representation of a design to a user within a very limited amount of time after the JCSP may receive a user's selection of a personalized characteristic (e.g., less than 5 seconds, or less than 3 seconds, or less than 1 second (e.g., depending on any latency in the system (e.g., network speeds and/or processing speeds) but not dependent on any manual user latency (e.g., any JGS subsystem backend designer manually constructing vector graphic images based on the user selection(s))), such that the a visual presentation may be updated nearly instantaneously (e.g., without any noticeable delay) for the user in response to a selected change to the design). Such manufacturing constraints that may be automatically satisfied by the JGSP may include, but are not limited to, the design having a continuous surface (e.g., metal surface) without gaps, the name(s) and overall shape of the design having the design's text portions fit within a shape of the design's plate and/or the shape of the design's plate being dynamically adapted for connecting to the design's text portions, the design being structurally sound with no thin or small connection points, and/or the like. Once the consumer finally accepts a particular chosen design (e.g., a design with a visual representation provided during an online preview), the visual representation (e.g., exact imagery) that has been automatically generated by the JGSP and presented to the consumer for that chosen design may then be used by the JCSP as input(s) to a laser cutter or any other suitable manufacturing assembly in order to manufacture and deliver a physical representation of the consumer's chosen design for the personalized jewelry item that may exactly match the presented visual representation of the consumer's chosen design for the personalized jewelry item.

The JGSP may be configured to satisfy one or some or each of many possible requirements for providing an effective and efficient user experience. For example, the JGSP may be configured to provide customers with a real time dynamic view of any piece to be laser cut that may incorporate dynamic text and shapes. Additionally or alternatively, the JGSP may be configured to utilize client side rendering to ensure rapid adaption to dynamic text inputs (e.g., at client application 203a). For example, website scripts of the JGSP may be run in one of two places, such as the client side, which may also be referred to herein as the front-end (e.g., using client application 203a at user device 202), or the server side, which may also be referred to herein as the back-end (e.g., using web server application 213a at web server subsystem 210). The client of a website may refer to a web browser (e.g., client application 203a) that is viewing the website. The server of a website may be the server that hosts the website (e.g., web server subsystem 210). Any suitable app or web coding languages may be designed such that any suitable algorithms and/or operations and/or processes of the JGSP described herein may be run at least partially on the server side and/or may be run at least partially on the client side. Additionally or alternatively, the JGSP may be configured to use any suitable automatic algorithm(s) (e.g., kerning algorithm(s) (e.g., of a jewel generating algorithm)) to ensure that all characters in the text elements of a design for a personalized jewelry item are positioned in such a manner to guarantee successful cutting while preserving structural integrity of the jewelry item ensuring that all characters are legible. Additionally or alternatively, the JGSP may be configured to use any suitable automatic algorithm(s) (e.g., positioning algorithm(s) (e.g., of a jewel generating algorithm)) to ensure automatic placement of the text elements embedded in vector shapes, such that placement and size of the text may be optimized to ensure aesthetic appeal and legibility. Additionally or alternatively, the JGSP may be configured to use any suitable automatic algorithm(s) (e.g., placement algorithm(s)) to ensure automatic placement of text adornments, such as hanging charms and filigree. Additionally or alternatively, the JGSP may be configured to provide or otherwise utilize backend support to access a vector graphic representation (e.g., a file 220*jf*) of the design for a personalized jewelry item presented to or ordered by the customer that can be directly used in cutting the product for shipment to the customer.

Parameter intake may be enabled. For example, there may be several parameters that a nameplate preparation tool of the JGSP (e.g., a tool or module carrying out any suitable jewelry generating algorithm(s)) may consume. These parameters may either be passed to a web server (e.g., a rendering web server) via URL query parameters (e.g., as data 204 from application 203a), or using internally passed variables. URL query parameters may be passed through the URL in a query string. Internally passed variables may come from static configurations and files (e.g., as may be provided by static data server subsystem 230 (e.g., via data 226)). An "internal name" may be what exists in an internal "config" Javascript object, while its "query string" equivalent may be what exists on a URL that may ultimately be converted to the internal name. The URL may be updated for values or parameters or variables that may affect the appearance of the product (e.g., metal selection, name selection, chain selection, charm selection, etc.), such as may be chosen by user U while interacting with GUI 203 for designing a personalized jewelry item. There may be some values that may be irrelevant for the display of the product (e.g., for the visual representation of the item during an online preview), such as chain length and printed photo box. In some embodiments, every change may be passed along to the image server (e.g., to image server subsystem 220 (e.g., as data 214)).

Various types of internal names may be used by the JGSP, including, but not limited to, one, some, or each of the following, which may include an equivalent query string in parenthesis:

style code (no query string equivalent): This may be unique to the style or type of nameplate that may be presented (e.g., JWLN0300, such as for a "Personalized Name Necklace" type nameplate, as shown by GUI 203 of screen 500B of FIG. 5B, which may, for example, be provided for any suitable URL 541b (e.g., a URL of https://www.jewlr.com/products/JWLN0300/personalized-name-necklace);

nameFont (ef): This may indicate the desired nameplate font to be used (e.g., Arial);

names[i] (e<i>) (mapped to names[i].value): This may be passed in as a series of names such as e1=Ashley&e2=Daniel and remapped to a canfig.names array;

nameSize (z): For certain nameplates, this value may determine the sub-size to use in nameFontSizes, such as for a "Monogram Name Pendant" type nameplate, as shown by GUI 203 of screen 300 of FIG. 3, which may, for example, be provided for any suitable URL 341 (e.g., a URL of https://www.jewlr.egm/products/JWLN0301/monogram-name-pendant);

ecName (ec): For certain nameplates, this value may determine the filigree to use in an associated nameplate source SVG file or a base nameplate design by "name count" (e.g., a 1-name nameplate vs. a 2-name nameplate vs. a 3-name nameplate or the like (e.g., a 1-name nameplate for a "Stylized Name Necklace" type nameplate, as shown by GUI 203 of screen 500A of FIG. 5A, which may, for example, be provided for any suitable URL 541a (e.g., a URL of https://www.jewlr.com/products/JWLN0325/stylized-name-necklace) vs. a 4-name nameplate for a "Family Tree Cutout Necklace" type nameplate, as shown by GUI 203 of screen 400 of FIG. 4, which may, for example, be provided for any suitable URL 441 (e.g., a URL of https://www.jewlr.com/products/JWLN0415/family-tree-cutout-necklace or a URL of https://www.jewlr.com/products/JWLN0415/sterling-silver-family-tree-cutout-necklace?e1=Ashley&e2=Daniel&e3=Wendy&e4=Janelle&ch=(e.g., for the particular design being previewed by visual representation 421 of GUI 203 of screen 400 of FIG. 4))));

metalColor (sk): A single character that may represent the metal color to present (e.g., "y" for "yellow", "w" for "white", "r" for "rose", etc.);

chainName (ch): This parameter, when defined, may change the appearance of the chain when multiple options are available (e.g., "cable", "rope", or "curb" chains all may appear differently); and charmName (a1): This parameter, when defined, may utilize the "charm eyelet" that may be found in a source SVG file and may display a jump ring and a charm vector or raster graphic.

In addition, there may be several "constants" that may exist for a particular style code, and these may be loaded in via an externally located JSON file that may be parsed by a nameplate preparation tool of the JGSP and may be populated into appropriate config values, and may include, but not limited to, one, some, or each of the following:

scaleWidth/scaleHeight: This may be a decimal value that may multiply element(s) of an original SVG file up for scale when working in a nameplate preparation tool of the JGSP (e.g., a "Nameplate Prepper" tool or a "name assembly" tool) and/or while drawing letters with their size (e.g., width and/or height) derived from a nameFontSizes value;

nameMode: This may be a Boolean variable, which, when set to "true", may instruct a nameplate preparation tool of the JGSP to manipulate any left/right eyelets and charm eyelets based on the positioned letters, their characteristics, and/or a charm placement algorithm (e.g., of a jewel generating algorithm) (e.g., to set up a special mode in a nameplate preparation tool of the JGSP to dynamically move the left/right and charm eyelets based on a constructed name), and/or this may set a few other things, including, but not limited to, one or more of an iteration step size, setting a default name of "Ashley" or any other suitable default name when no name has been provided by a user, auto eyelet positioning with the SVG file based on the current name letters (e.g., first and last letters), filigree placement and resizing of any filigree to a current name (e.g., if available), and/or the like;

config.names.: This may be an array with each value being an object with a "name" (e.g., not to be confused with the customer's desired name but the query string parameter name) and/or a "direction"; and nameFontSizes: This may be a set of font sizes that may be drawn in relation to the source SVG file after being resized to any scaleWidth/scaleHeight factor(s), and/or this may be an object that may map a selected font size to a desired numerical value.

After the parameters have been initialized and populated into the correct places, the download of a nameplate source SVG file may take place. A particular source SVG file to be downloaded may only be selected (e.g., variable) based on a particular style code provided. Each source SVG file may be actually saved with a file name related to its associated style code, which may be how a particular file may be selected and downloaded (e.g., by image server subsystem 220 (e.g., from static data server subsystem 230 (e.g., as static response data 226) of system 201 of FIG. 2 (e.g., static data server subsystem 230 may store any suitable number of template nameplate source files 230*nf* (e.g., SVG files) for selective loading and use by subsystem 220))). A particular template nameplate source file may include several required and/or optional pieces, which may be broken into groups and objects (e.g., SVG file broken into SVG groups and SVG objects), where all naming conventions for such groups and objects may assume N to be a unique number to that name.

Figure 6:
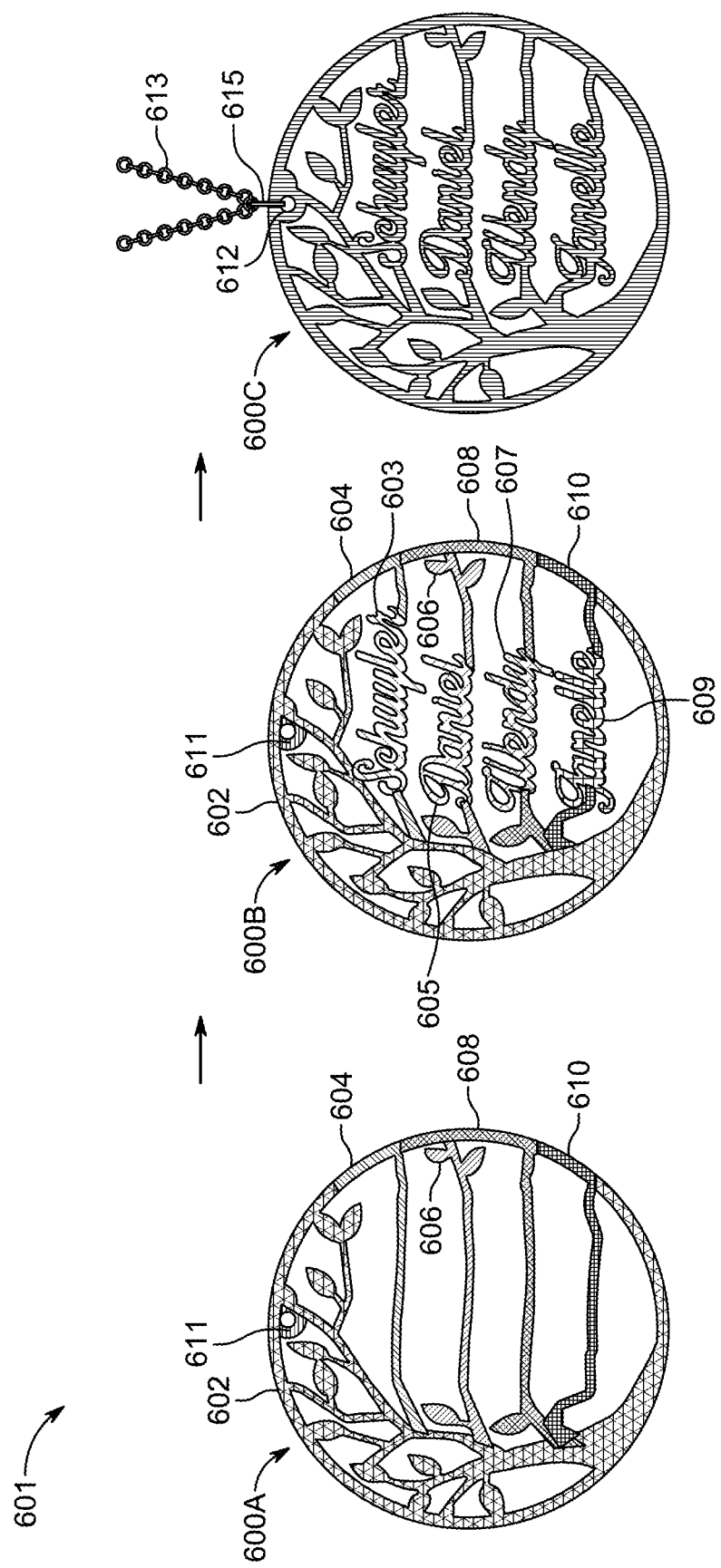
FIG. 6 illustrates a development progression of a jewelry item.

A plate group may contain any pieces or objects that may remain or be divided by names. For example, such objects that may not be divided by names may be called plateN objects, where N may be a unique number. For example, a plate1 object portion 602 of an exemplary "Family Tree Cutout Necklace" type nameplate 600 of FIG. 6 may be an object that may not be divided by any names. As shown by FIG. 6, for example, a nameplate development progression 601 may illustrate a progression from a nameplate configuration 600A (e.g., an SVG template nameplate of a template nameplate source SVG file for a particular "family tree cutout necklace" type nameplate) to a nameplate configuration 600B (e.g., an SVG customized jewelry item of a customized jewelry item SVG file for the particular "family tree cutout necklace" type nameplate with one or more customized variables (e.g., four customized names)) to a nameplate configuration 600C (e.g., an SVG merged jewelry item of a merged jewelry item SVG file for the particular "family tree cutout necklace" type nameplate with one or more customized variables (e.g., four customized names) and/or eyelets and/or chains and/or jump rings and/or the like merged together). For example, such objects that may be divided by names may be called eN objects, where N may be the corresponding name number. For example, an e1 object portion 604 of nameplate 600 of FIG. 6 may be an object that may be divided by at least one name (e.g., Generated Name 1 object portion 603: "Schuyler"), an e2 object portion 606 of nameplate 600 of FIG. 6 may be an object that may be divided by at least one name (e.g., Generated Name 2 object portion 605: "Daniel"), an e3 object portion 608 of nameplate 600 of FIG. 6 may be an object that may be divided by at least one name (e.g., Generated Name 3 object portion 607: "Wendy"), and/or an e4 object portion 610 of nameplate 600 of FIG. 6 may be an object that may be divided by at least one name (e.g., Generated Name 4 object portion 609: "Janelle"). Eyelets may also be objects that may belong in this group and may have any suitable names, such as left-eye and right-eye for festooned left/right eyelets, top-eye for a centered chain fished through a jump ring, charm-eye for placement of the charm (e.g., if applicable), and/or the like. For example, a top-eye object portion 611 of nameplate 600 of FIG. 6 may be provided for a centered chain 613 that may be fished through a jump ring 615 that may pass through the eyelet 612 of top-eye object portion 611. As another example, a left-eye object portion 1211 of nameplate 1200 of FIG. 12 may be provided for a festooned left eyelet 1212, and/or a right-eye object portion 1241 of nameplate 1200 of FIG. 12 may be provided for a festooned right eyelet 1242.

Figure 12:
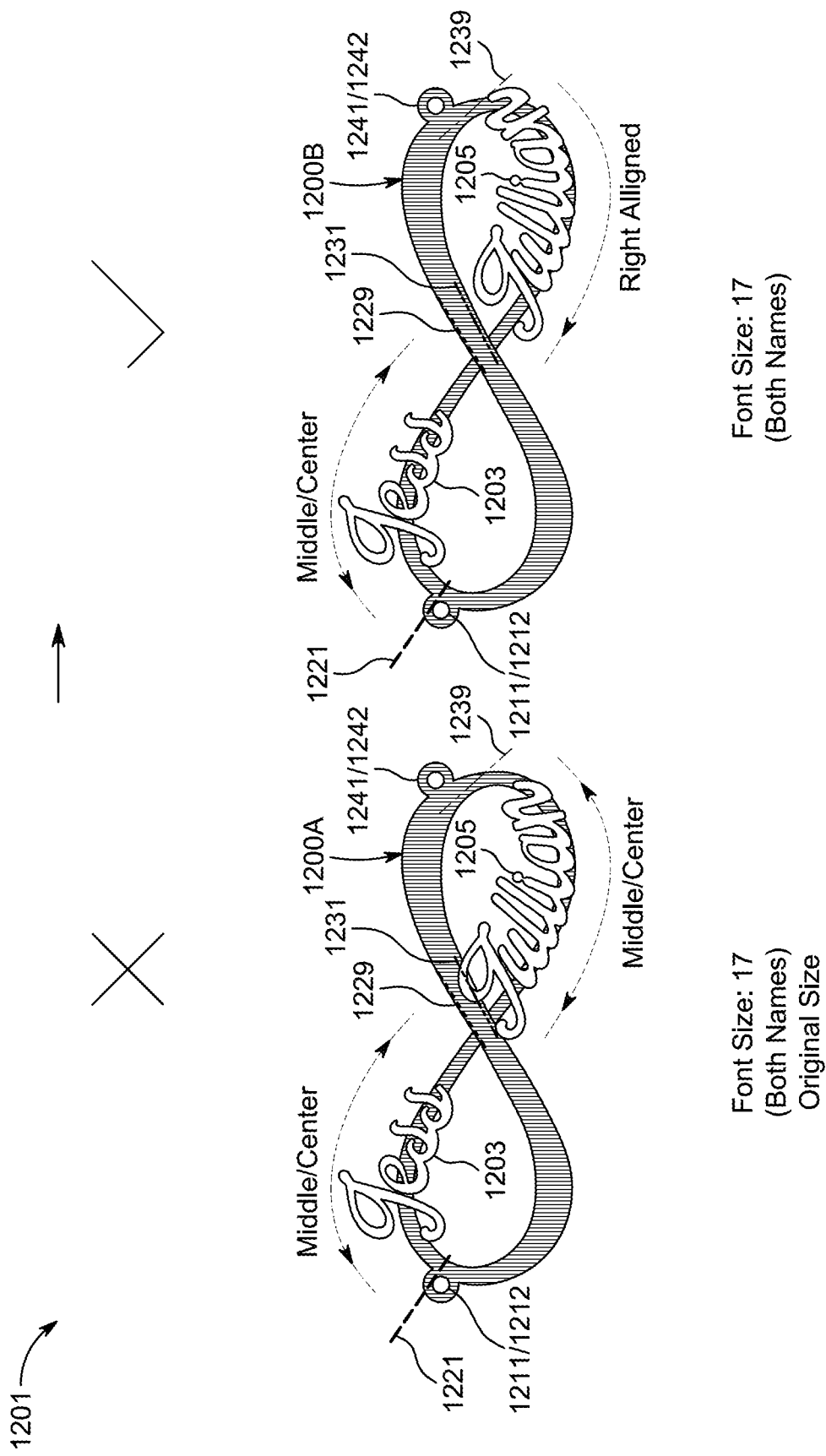
FIG. 12 illustrates a development progression of yet another jewelry item.

A guides group may contain any or all name paths and bounds, such as an eN-path, an eN-left-bound, and/or an eN-right-bound, where N may be the corresponding name number. For example, an e1-left-bound portion 1221 of a nameplate 1200 of FIG. 12 may be a bound that may ensure that no letter of a first name (e.g., Generated Name 1 object portion 1203: "Jess") may extend to the left beyond that bound. For example, as shown in FIG. 12, a nameplate development progression 1201 may include a progression from a nameplate configuration 1200A (e.g., an SVG customized jewelry item of a customized jewelry item SVG file for a particular "infinite love name necklace" type nameplate with one or more customized variables (e.g., two customized names)) to a nameplate configuration 1200B (e.g., an SVG customized jewelry item of a customized jewelry item SVG file for a particular "infinite love name necklace" type nameplate with one or more customized variables (e.g., two customized names (e.g., as may be updated from configuration 1200A with an adjusted alignment for at least one of the names))). As another example, an e1-right-bound portion 1229 of a nameplate 1200 of FIG. 12 may be a bound that may ensure that no letter of the first name (e.g., Generated Name 1 object portion 1203: "Jess") may extend to the right beyond that bound. As another example, an e2-left-bound portion 1231 of nameplate 1200 of FIG. 12 may be a bound that may ensure that no letter of a second name (e.g., Generated Name 2 object portion 1205: "Jullian") may extend to the left beyond that bound. As another example, an e2-right-bound portion 1239 of nameplate 1200 of FIG. 12 may be a bound that may ensure that no letter of the second name (e.g., Generated Name 2 object portion 1205: "Jullian") may extend to the right beyond that bound. The bounds may be optional, but may ensure that letters of a name never go beyond certain points.

A fills group may contain any or all named filigrees and/or any or all unnamed filigrees. Fills can contain fill-N or fill-<name>-N groups, where <name> may be a lowercased parameterized name of the filigree, and/or where N may represent a variation number, and/or where several filigree widths may be made for varying name sizes. A fill-N/fill-<name>-N group can contain any suitable elements, such as <fill-name>_fixed-N and/or <fill-name>_scaled-N, where <fil-name> may be the group name. A <fill-name>_fixed-N element may be an element in a filigree that may not be scaled to the size of the name, but may retain a relative position after scaling. This can also be a group that contains eyelets that may override an eyelet found in a root plate group (e.g., <fill-name>_fixed-N-right-eye). It is to be noted that a fixed filigree itself may be named as <fill-name>_fixed-N-path and may be found inside this group as well. A <fill-name>_scaled-N element may be an element that may be scaled width-wise to a name's width, which may be defined as a left position of a cut guide of a first letter of a name, to a rightmost position of a last letter of a name.

As mentioned, a nameMode setting may set up a special mode in a nameplate preparation tool of the JGSP to dynamically move the left/right and charm eyelets based on a constructed name. This mode may be enabled when the name itself is the sole feature of a design (e.g., when there are no other shapes or pieces that are involved in the name design, or the shapes/pieces that are involved are complementary to the name after it has been constructed). Notably, there may be no real usage of "name on a curve" when working in this mode.

Font ingestion and/or font characterization may be achieved prior to personalize jewelry generating. For example, before the name drawing can begin, a desired font file (e.g., a particular font file 230ff) may first be loaded (e.g., into a PaperJS project) as may be drawn letter-by-letter (e.g., for font ingestion and/or characterization). For example, an initial strategy can use an OpenType.js library in combination with a TTF version of the font to draw each letter. However, there may be one or more disadvantages to this. For example, a disadvantage may be that there may be no hints or suggestions as to where the "connectable" portions of the letters were located. Additionally or alternatively, a disadvantage may be that the font files may be moderately large in size and/or may be more difficult to manipulate when adjustments are needed. Additionally or alternatively, a disadvantage may be that complementary "configuration" files may be constructed for each font with general guides, eyelet locations, and/or baseline attributions for better name connectability, which may be referred to as "font characterization". Additionally or alternatively, a disadvantage may be that the vertices for all vectors may be triplicated, each with their own respective handles, which may be difficult to manipulate post-drawing in a nameplate preparation tool of the JGSP. A different strategy may be developed where the font may be drawn in any suitable vector graphics editor (e.g., Adobe Illustrator or CorelDRAW or the like) on a straight horizontal line, letter by letter, with adequate space in between each letter, where adequate space may mean that, for each particular letter (e.g., the letter "A"), its cut guides, left guides, right guides, eyelet placements, and the vector/shape of the letter itself may not intersect or interact with any other subsequent letters (e.g., the letter "B") in the same font file. This "adequate space" concept may be demonstrated by listing 700 of capital letters 702 of a particular font of FIG. 7 that may illustrate certain capital-letter characteristics.

As shown, each capital letter 702 may be provided with its own defining characteristics as needed for a nameplate preparation tool of the JGSP. This may include a cut guide 704 (e.g., for preventing "path overflow" when the letter may not be adequate in separating an underlying name necklace design), a left guide 706 (e.g., for connections), a right guide 708 (e.g., for connections), a left eyelet position 701 and a right eyelet position 709 (e.g., for nameMode (e.g., as shown but not labelled for each letter for clarity sake)), and/or the like.

Figure 7:
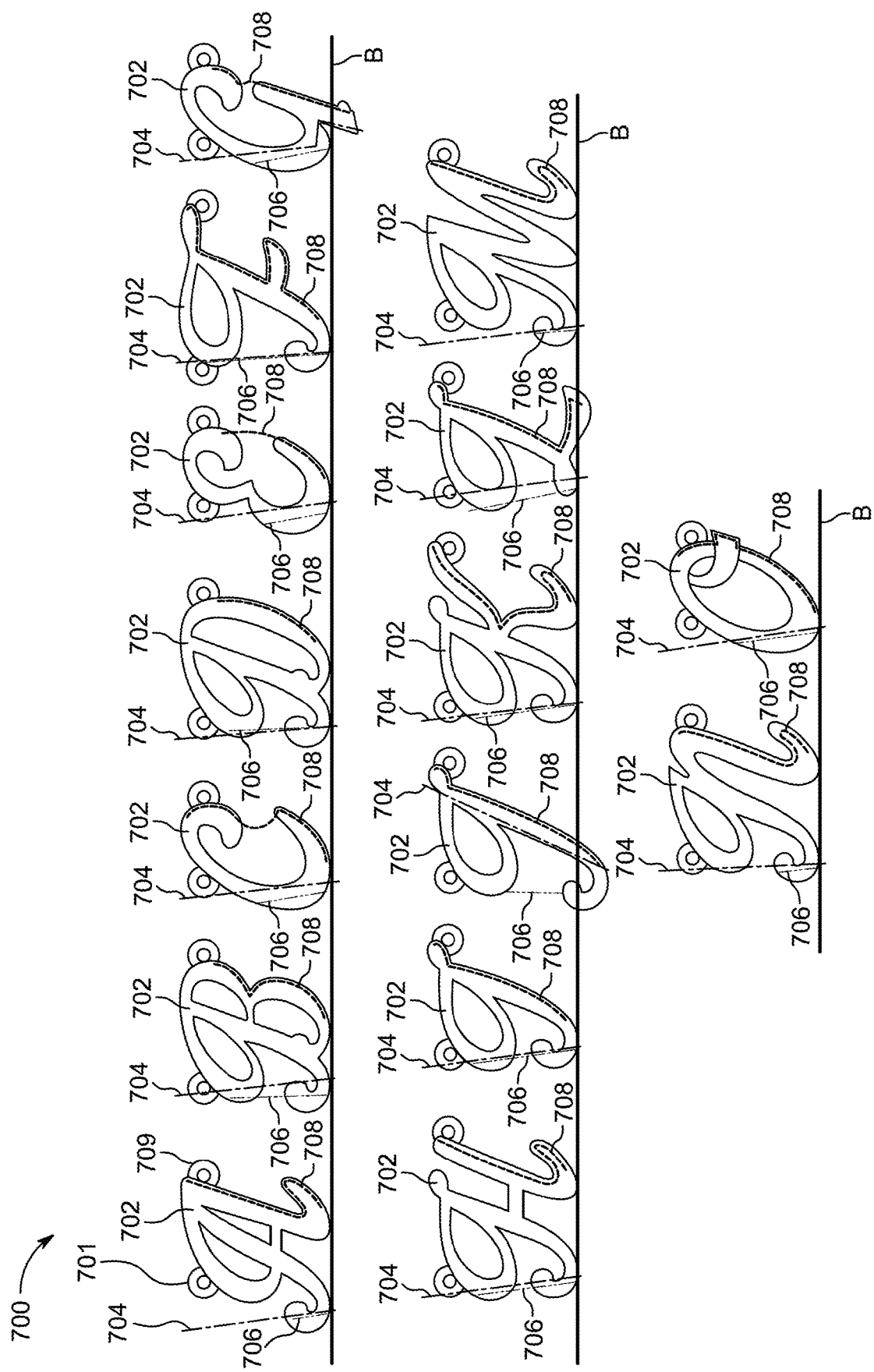
FIG. 7 illustrates a listing of letters of a font file.

A noticeable characteristic may be that a cut guide 704 may be found on a LEFT side of each capital letter 702 of FIG. 7, and that left and right eyelets may be found for each capital letter 702 of FIG. 7. The eyelets, guides, and letter may all be separate paths, each of which may be identified with their own identifier ("ID"). A convention may be as follows for a <letter> (group): <letter>-path (the letter path), <letter>-left-guide (left guide), <letter>-right-guide (right guide), <letter>-cut-guide (cut guide), <etter>-left-eye (left eyelet position), and/or <letter>-right-eye (right eyelet position). The <letter> portion of the name may be always repeated as SVG path and group IDs may be (e.g., must be) unique.

SVG may be an eXtensible markup language ("XML"), which may use tags with attributes to characterize shapes and visual presentation. Ways to show a shape may be <line> and <path> tags. These tags may contain attributes that may characterize the shape of the line or path, and other styling references that may change the visual appearance of the shape, such as fill color, stroke color, stroke width, and/or gradients. They can also contain hierarchy-type attributes, such as "id". Paths can be created with these "id" attributes in such a way that they may be references in the future to get a specific characteristic that may be desirable to work with (e.g., such as "<letter>-left-guide" as mentioned, may allow one to get the path with the ID of "A-left-guide" for the letter "A"). To make organization easier and/or to optimize font files a little better, these paths and lines can be grouped into "<g>" tags. These <g> tags can also carry their own ID but may (e.g., must) be different from all other tags and elements that may be contained in a single font file (e.g., a single SVG file0. Such characterization may be done on every character for every font.

The characteristics may be determined by a designer who may ensure that the left/right guides, cut guides, and/or eyelet positions may reasonably describe how a letter can be conjoined to any other letter. The general strategy may be that the left/right guides may follow slightly inside of the letter's shape, the left/right eyelets may be generally in the upper left/upper right area of the letter's shape, while still connecting to the letter, and/or the cut guide(s) may generally intersect the outer left or outer right edges of the letter's shape, while extending far above and below the letter itself.

Figure 8:
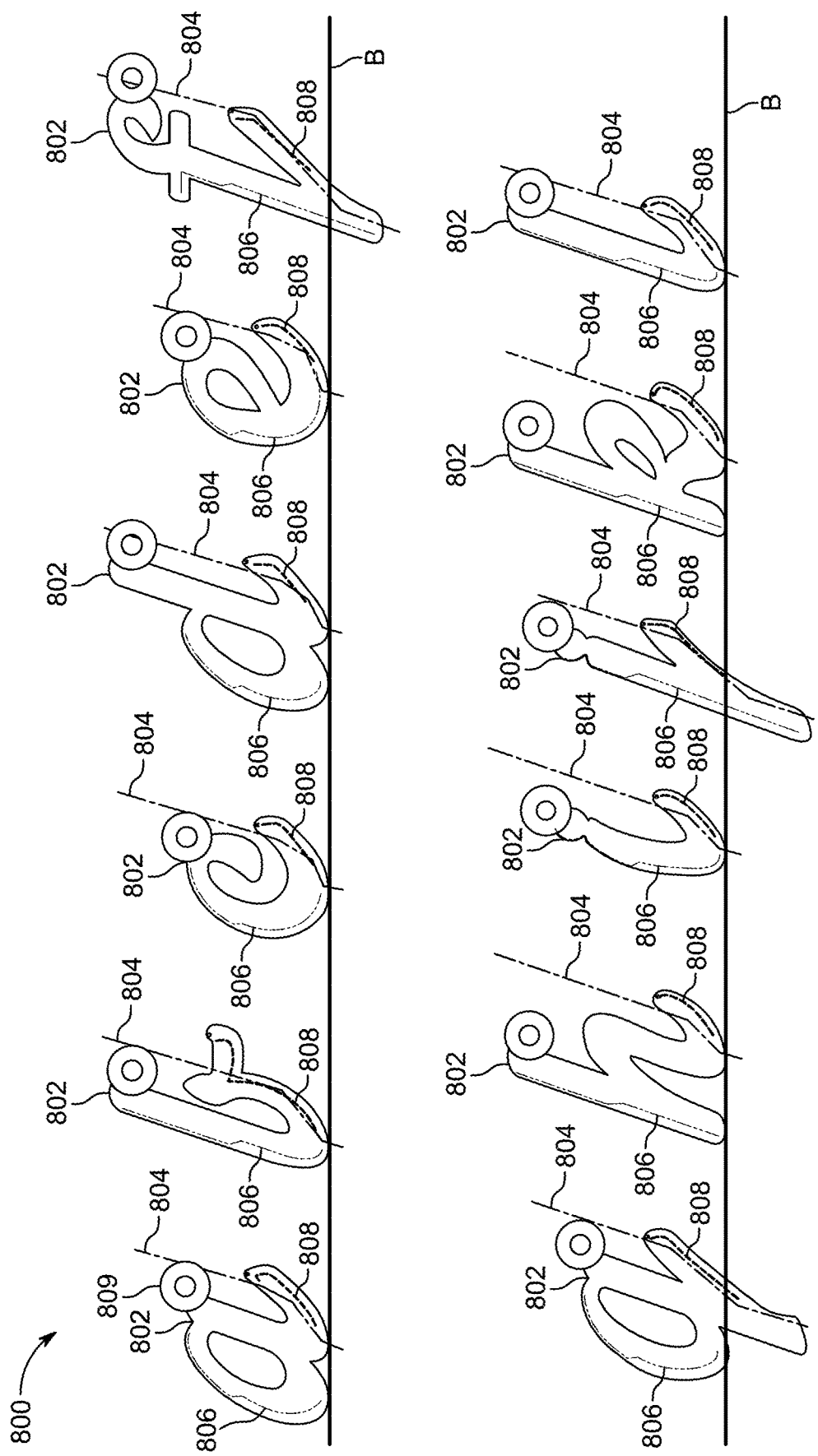
FIG. 8 illustrates another listing of letters of a font file.

There may be a few differences from capital letters to lowercase letters, as shown in a comparison of listing 700 of capital letters 702 of FIG. 7 that may illustrate certain capital-letter characteristics with a listing 800 of lowercase letters 802 of a particular font of FIG. 8 that may illustrate certain lowercase-letter characteristics. As shown, each lowercase letter 802 may be provided with its own defining characteristics as needed for a nameplate preparation tool of the JGSP. This may include a cut guide 804 (e.g., for preventing "path overflow" when the letter may not be adequate in separating an underlying name necklace design), a left guide 806 (e.g., for connections), a right guide 808 (e.g., for connections), a right eyelet position 809 (e.g., for nameMode (e.g., as shown but not labelled for each letter for clarity sake)), and/or the like.

Figure 3:
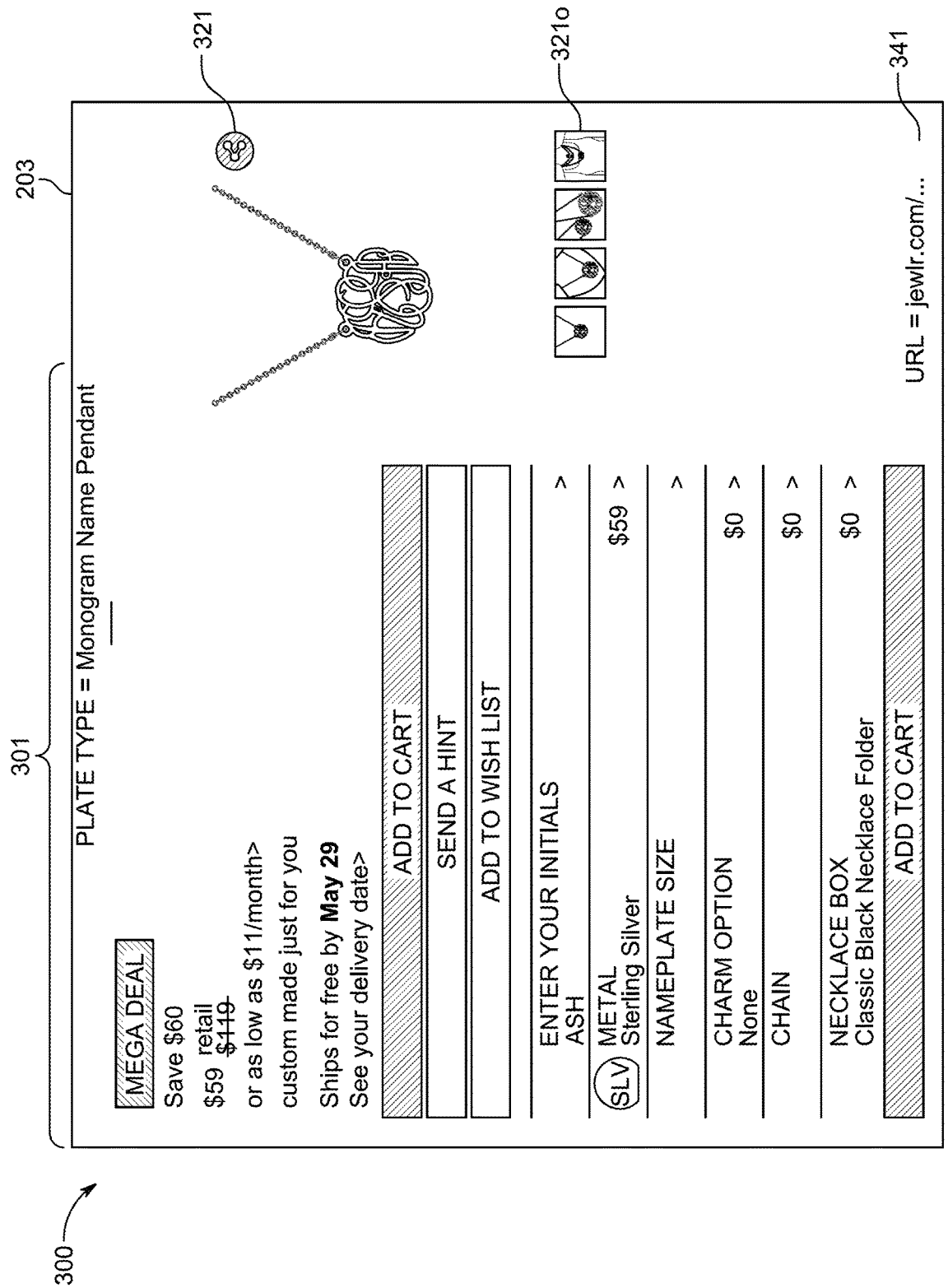
FIGS. 3, 4, 5A, and 5B are front views of screens of a graphical user interface of the user electronic device of FIG. 2.
Figure 4:
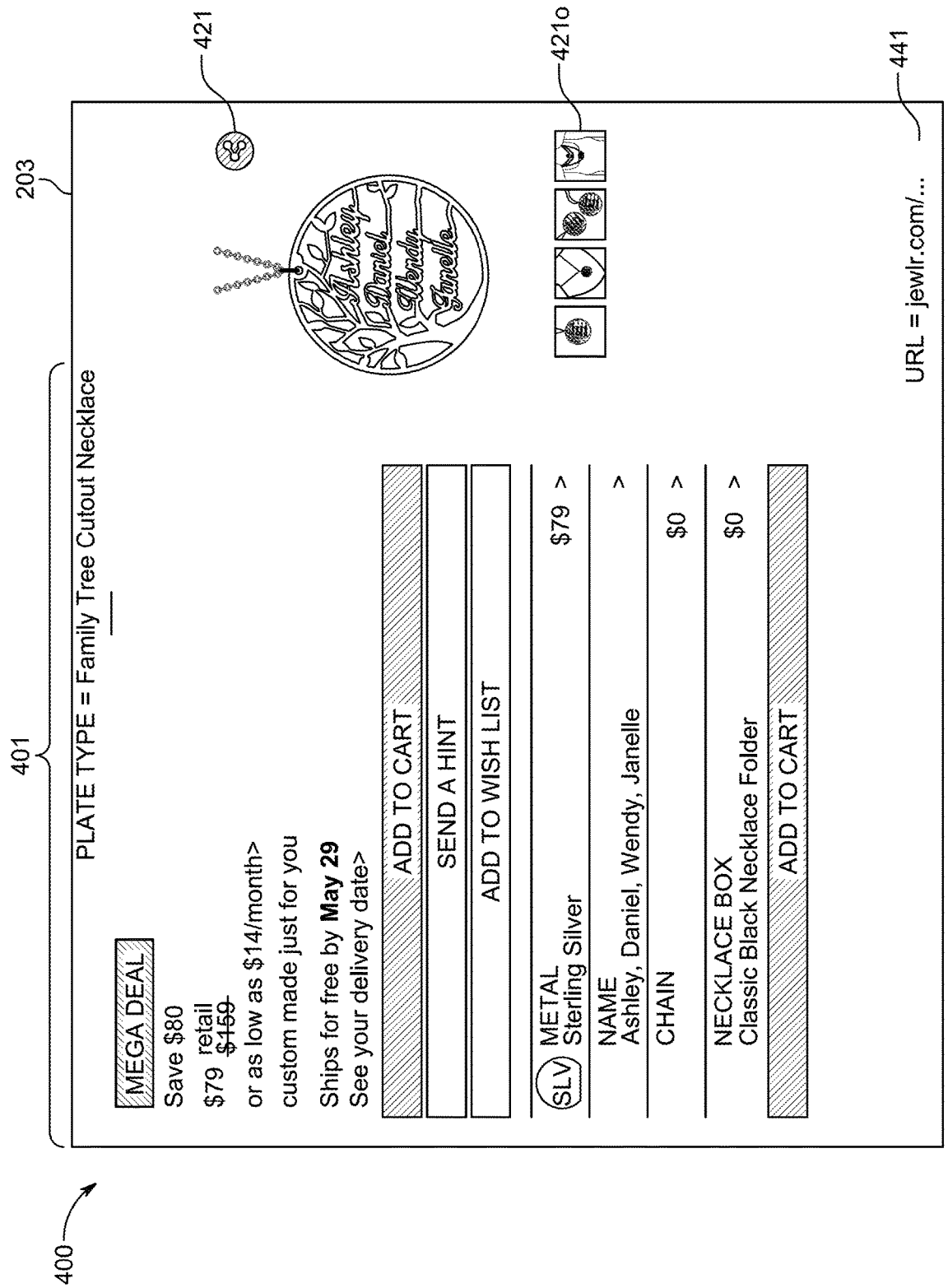
Figure 5A:
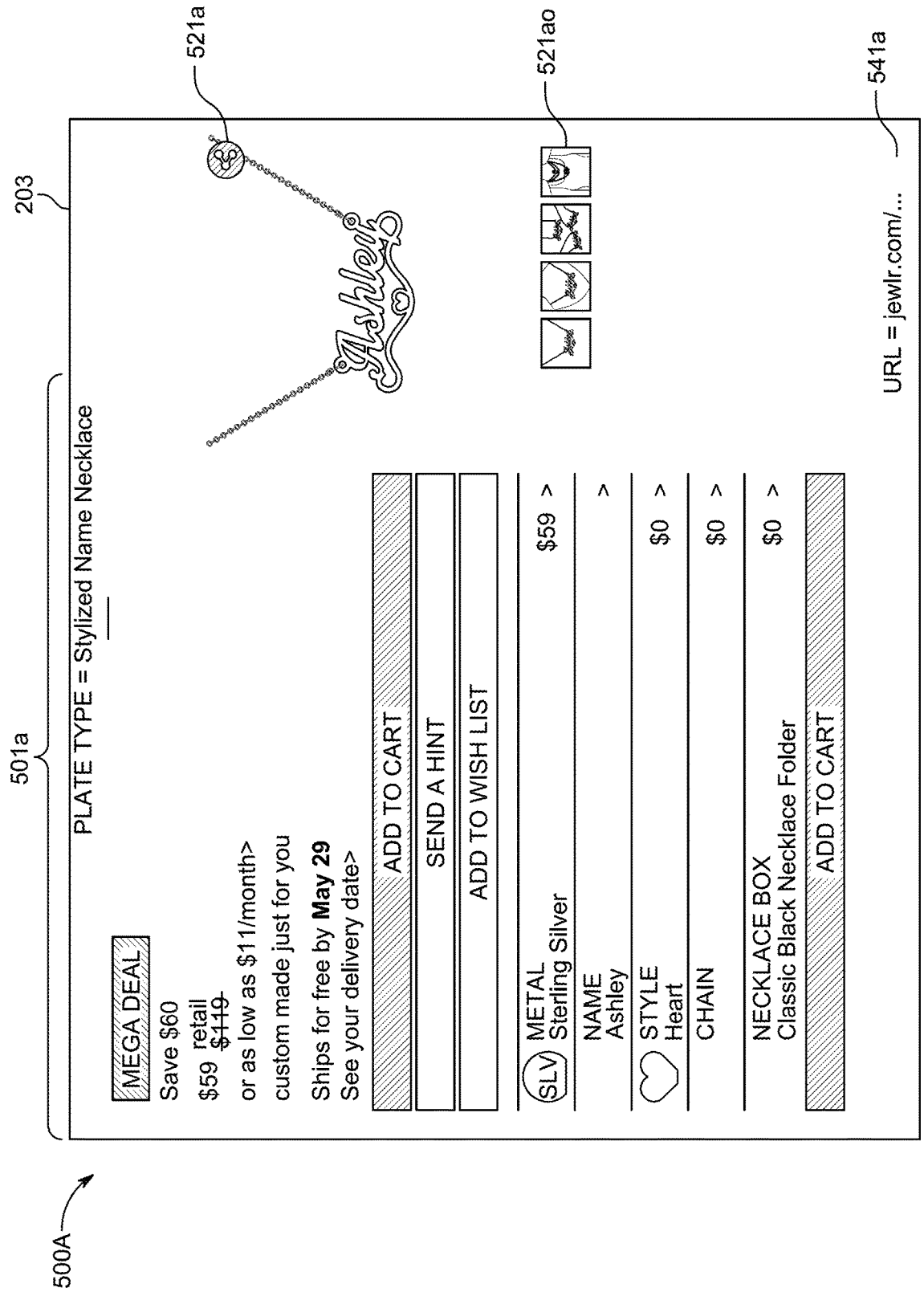
Figure 5B:
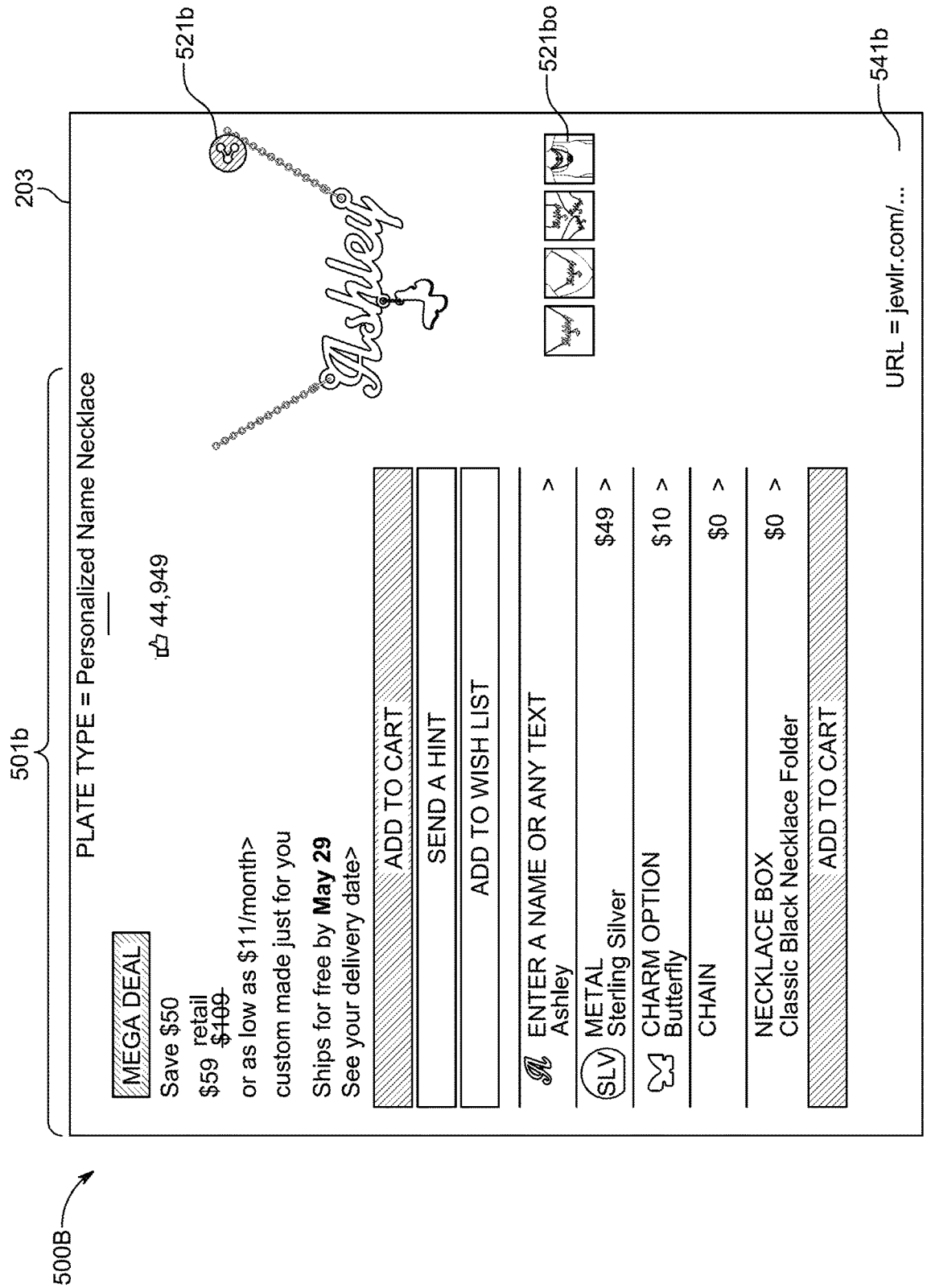

A key difference between characteristics of lowercase letters and capital letters may be that there may be no left eyelet position for each lowercase letter (e.g., as there may be restrictions that require a capital letter glyph or symbol glyph (e.g., the symbol "@" or "#", etc.) to start each name). In addition, cut guide 804 may be found on the right side of each lowercase letter 802 instead of on the left side (e.g., as compared to cut guide 704 that may be found on the left side of each capital letter 702), such as because the lowercase letters might only be found on the trailing end of a name. For example, an end-user/customer may be forced to use a "title-ized" name where the first letter must always be capital and the last letter must always be lowercase. Though this is certainly not a requirement. For example, as shown in FIG. 3, the name of visual representation 321 is a set of three initials, each of which may be capitalized.

Therefore, as shown in FIG. 2, any suitable number of font files 230*ff* may be generated (e.g., created by a designer of the JGSP) in any suitable manner and stored in static data server subsystem 230 for selective loading and use by subsystem 220 (e.g., in combination with any suitable nameplate file 230*nf*), such as for use in automatically creating a customized jewelry computer graphics (e.g., vector graphics) image file (e.g., a customized and/or merged jewelry image file 220*jf*) that may be used for presenting a visual representation of a personalized jewelry design to a customer designer and/or for generating and delivering a physical representation of the personalized jewelry design to an end user.

A particular name may include a capital letter 702 as a first letter and one or more lowercase letters 802 as the trailing letters, such as name 902 spelling "Ashley" of FIGS. 9A-9F. For example, FIGS. 9A-9F, may illustrate a nameplate development progression that may include a nameplate configuration 900A of FIG. 9A (e.g., an SVG customized name of a customized name SVG file for a name without an underlying plate design (e.g., a "personalized name necklace" style type) that may illustrate various eyelets and guides of each letter of the name) to a nameplate configuration 900B of FIG. 9B (e.g., an SVG customized jewelry item of a customized jewelry item SVG file for a name without an underlying plate design (e.g., a "personalized name necklace" style type) that may be similar to configuration 900A but with certain guides removed and certain eyelets highlighted for removal) to a nameplate configuration 900C of FIG. 9C (e.g., an SVG customized jewelry item of a customized jewelry item SVG file for a particular type nameplate with the customized name of configurations 900A and 900B prior to removal of any portions of the nameplate) to a nameplate configuration 900D of FIG. 9D (e.g., an SVG customized jewelry item of a customized jewelry item SVG file for a particular type nameplate with the customized name of configurations 900A-900C but with only removal of limited portions of the nameplate) to a nameplate configuration 900E of FIG. 9E (e.g., an SVG merged jewelry item of a merged jewelry item SVG file for the particular type nameplate with the customized name of configurations 900A-900D but with only removal of the limited portions of the nameplate of FIG. 9D) to a nameplate configuration 900F of FIG. 9F (e.g., an SVG customized jewelry item of a customized jewelry item SVG file for a particular type nameplate (e.g., a portion of a "family tree cutout necklace" (see, e.g., FIG. 4)) with the customized name of configurations 900A-900E but with removal of all appropriate portions of the nameplate). Cut guide 804 may be adjacent and within the right side of each trailing lower case letter 802 of name 902 because the path that it may divide may stop on the right side of its letter 802. However, the inverse may be true for cut guide 704 of leading capital letter 702.

It is to be understood that support may be available for capital letters to b: trailing or within a name, and for trailing letters to be at the start of a name. The ability to allow capital letters within a name or a lowercase letter at a beginning of a name may be understood to be possible, such as through the addition of left eyelet positions at each lowercase letter 802, and/or the definition of two cut guides per letter instead of just one cut guide for each letter.

An important (e.g., the most important) characteristic of a font when doing a name drawing and assembly may be the left and right guides. This may be demonstrated by the classic "Ashley" name 902 of FIGS. 9A-9F, which may be a rough approximation for visual purposes (e.g., the baseline may not be accurate and only a horizontal line may be used as an example to draw on), however, it may be seen how a right guide of one letter and a left guide of the following adjacent letter may be joined together instead of just allowing the peripheries of the letters themselves to touch. This constraint may be to ensure a high level of connectedness when cutting the actual name necklace piece for strength and durability. Before the final export, the guides may be discarded.

A baseline may be a line that one might follow if one were writing on a lined piece of paper. The bottom of the "Ashle" may all touch this line (see, e.g., horizontal baseline B of FIGS. 7 and 8), and the "y" may include the baseline in the middle of it. Although baseline B may be shown in FIGS. 7 and 8 and inherently in FIGS. 9A-9F to be a horizontal baseline, it is to be understood that a baseline of any name for any suitable plate may be any other suitable geometry, such as a curve (e.g., concave and/or convex) or any other suitable shape (see, e.g., FIGS. 10-13).

Figure 9A:
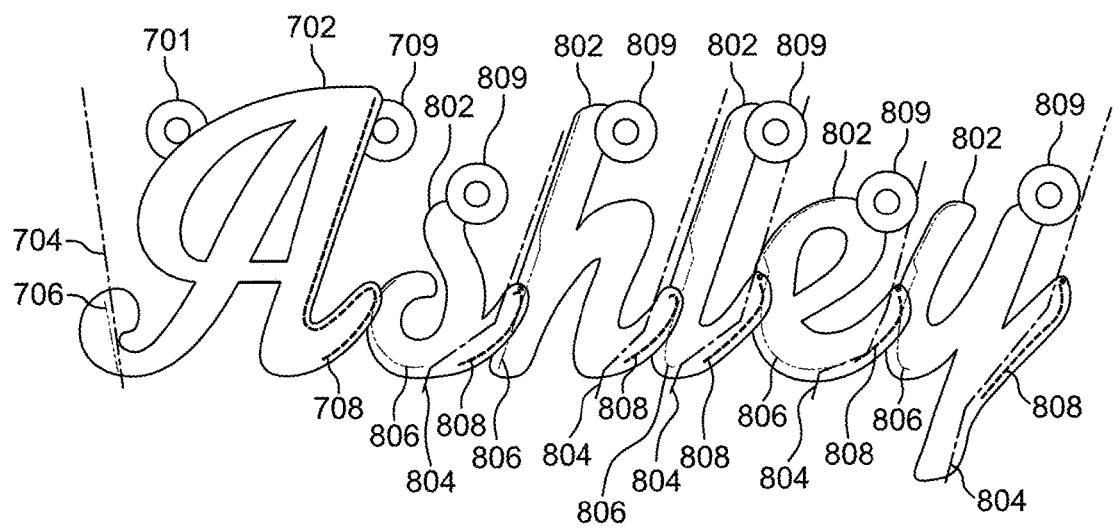
FIGS. 9A-9F illustrate a development progression of another jewelry item.
Figure 9B:
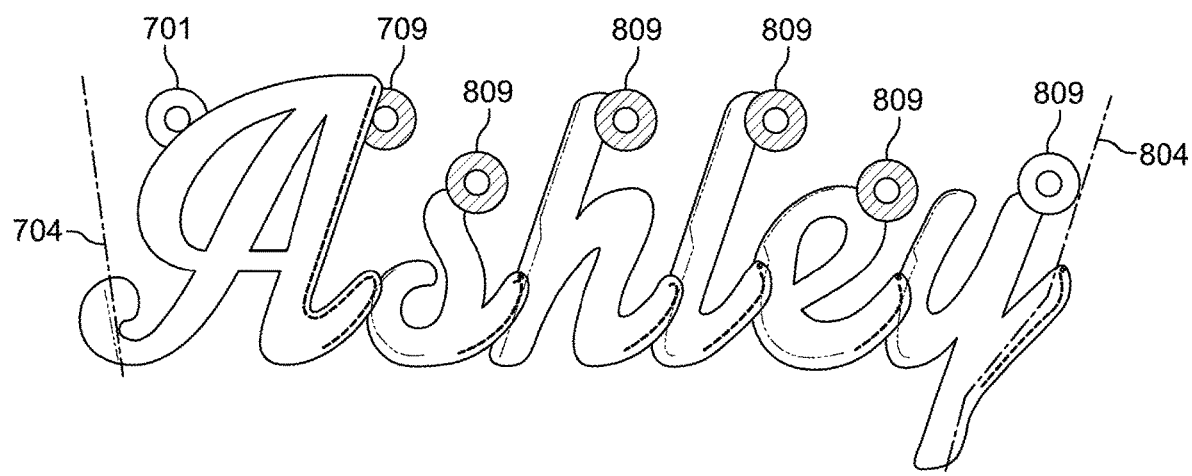

Interior letters may also have extraneous eyelet position paths that can also be discarded, such as eyelet position 709 of letter "A" and eyelet positions 809 of letters "s" and "h" and "l" and "e" of name 902 as may be highlighted in FIG. 9B. Therefore, as shown, only eyelet position 701 of letter "A" and eyelet position 809 of letter "y" of name 902 may be used (see, e.g., FIGS. 9C-9F).

Figure 9C:
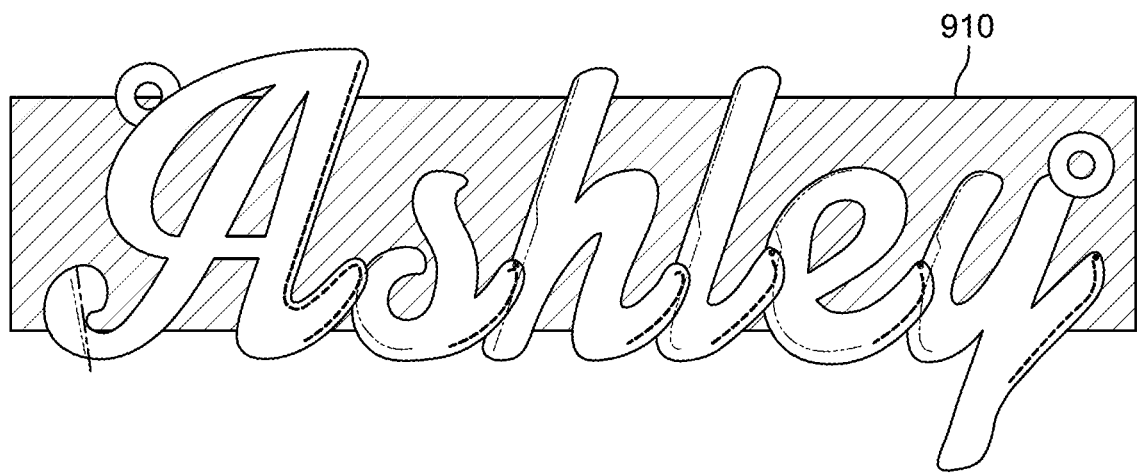
Figure 9D:
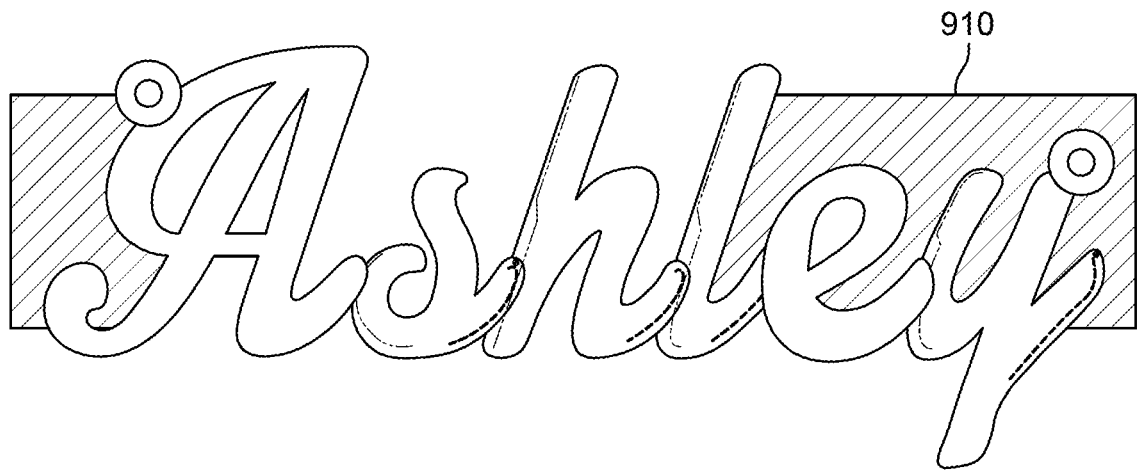
Figure 9E:
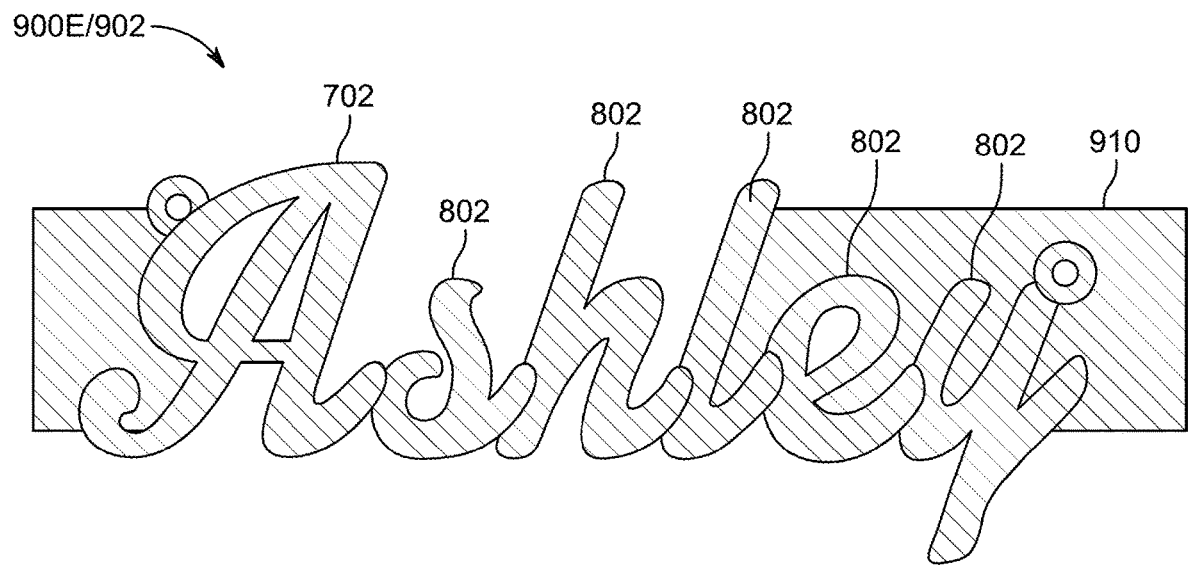

Another thing to demonstrate may be the usage of the cut guides or cut lines. When an underlying plate design may be used in conjunction with a constructed name, a cut guide may be used to assist letters that may not fully cut the underlying plate when being divided. The "y" letter 802 of name 902 of FIG. 9C may be used as an example. As shown in FIG. 9C, a nameplate object 910 may be provided as an underlying nameplate design that may be eventually unified and/or merged with name 902 itself. As shown, the "y" letter 802 of name 902 may not have a full height that would completely "cut" the underlying nameplate 910 (e.g., like letters "s" and "e" of name 902 and/or unlike letters "A" and "h" and "l" of name 902). For example, the "y" letter may be no different than the "s" or the "e" for the purposes of demonstration. The "y" may be focused on in this example purely because it is the last letter of name 902. If the "s" were the last letter of the name, then it may become the focus of the example. As a result, dividing by the first and last letters without the usage of cut guides (e.g., by removing portions of nameplate 910 completely enclosed by a letter and/or by removing portions of nameplate 910 divided by full height letters) may result in configuration 900D of FIG. 9D.

The "y" letter 802 may not have a full height that may allow for the underlying nameplate path 910 to be fully divided by the letter itself. Instead, a piece may result that may be shown by configuration 900E of FIG. 9E. As such a piece may not have a discernible separation, it may not be further manipulated without a cut guide.

When thinking of it as if you have a piece of paper, if one were to take a pair of scissors that can only cut once, and is only partially long enough to cut halfway into the paper, it is still a single piece of paper. It may be desired for the paper to be completely cut in half so that a result is two pieces of paper, one of which may be discarded in favor of showing the name. Thus, a pair of "scissors" may be needed that is longer than the paper itself that lets one cut the paper cleanly in two.

This may be not ideal due to the name becoming completely illegible once all the letters of name 902 and nameplate 910 are all made the same and then eventually cut (e.g., when merged (e.g., for use in presenting a visual representation of the design and/or for use in cutting a physical representation of the design)). The distinction between letters and nameplate may not come through when the design is finally cut as a metal where the cutting machine may not emboss—but may only cut. This is the appearance of the non-ideal cut and how it appears illegible as may be shown by configuration 900E of FIG. 9E (e.g., it is to be noticed how the letters of name 902 of FIG. 9E cannot be read past the letter "h", and this appearance may be the same after it comes out of the cutting machine).

Figure 9F:
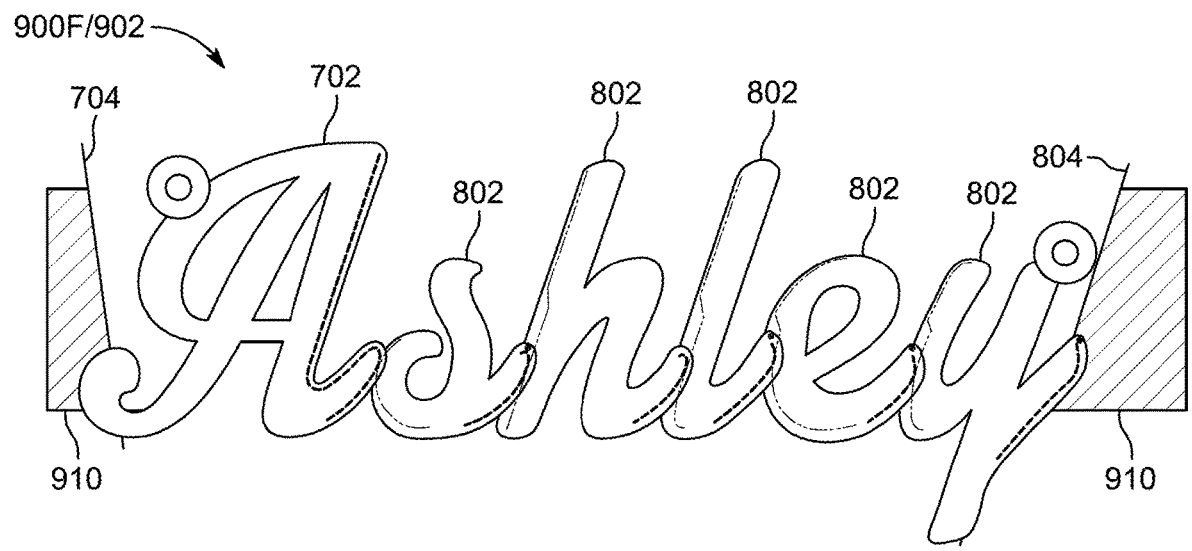

However, with the assistance of the cut guides of the letters of name 902 (e.g., of cut guide 704 of the "A" leading letter 702 and of cut guide 804 of the "y" final letter 802 of name 902), the letters may have additional assistance should the design of underlying nameplate 910 exceed the height of the cutting name 902, as may be shown by configuration 900F of FIG. 9F. The result may be perfect legibility due to the assistance of such cut guides 704 and 804 (e.g., as may be found in configuration 900B of FIG. 9B). The eyelets may not be incorporated here for these scenarios (e.g., for a nameplate scenario that may extend from each one of the left and right ends of a name (see, e.g., the name "Ashley" along a top object portion plate path of visual representation 421 of FIG. 4, which may be similar to the e1 object portion 604 of FIG. 6)). It should also be noted that the shape of the letters may take precedence when they exceed the cut guides in either direction.

Instead of simply using a cut guide to cut from an underlying "eN" plate path, a cut guide may be merged with its letter when it may be divided from an underlying "eN" plate path. This may allow any suitable shapes and/or curves of the letter that may extend into the right side of the cut guide (e.g., for trailing letters) or into the left side of the cut guide (e.g., for leading letters) to divide the "eN" plate path instead of the cut guide itself (see, e.g., the lower left portion of letter A of name 902 of FIG. 9F to the left of cut guide 704 that may divide a portion of the plate path). Then the cut guide may be removed to prevent the extended height of the cut guide from becoming a part of the plate itself. The purpose of these techniques may be to ensure a smooth overall appearance when the letters and underlying "eN" plate paths are all merged together (e.g., for presenting a visual representation of a design and/or for manufacturing a physical representation of a design).

Font optimization may be enabled. For example, there may be a few features involved with making fonts import and render faster within a single nameplate render. The fundamentals may include, but are not limited to local font storage (e.g., on a user device 202), reusing a single path to establish a baseline, and/or caching per letter. For example, with respect to letter caching, as the fonts may be saved as a large single-line font file 230$ff$ of all 52 letters (e.g., all 26 uppercase letters and all 26 lowercase letters) plus any extra symbol characters as appropriate (e.g., for the English language), they may also be grouped in an SVG file by their corresponding letter. Using these groups, a large font file can be split into at least 52 much smaller single font files and stored in a folder representing the font name. Then the letters can be pulled in as needed (e.g., by image server subsystem 220 requesting and receiving the one or more appropriate SVG font files (e.g., from static data server subsystem 230 (e.g., via request data 224 and/or response data 226)) to ensure that only the necessary letters may be rendered within a headless canvas. This may exceed the performance of a regular TTF font file as well because the individual SVG font files may range from 1 KB to 10 KB in size whereas a full TTF font file may be approximately 200 KB to 5 MB in size. For ease of use, those responsible for characterizing the font may not need to save the individual files, and a nameplate preparation tool of the JGSP may be configured to automatically handle this caching.

A jewelry generating algorithm may include a name restart or name redrawing algorithm that may be utilized for the purpose of bounds constraining and/or overshooting. In this scenario, the font size may be slightly reduced and then the entire nameplate may start over again from this section, even if previous names were successfully drawn. This may be due to a design constraint of font sizes being configured to be consistent throughout an entire nameplate. Even though a name font size may be reduced during a redraw, a final merged name necklace itself may be actually enlarged to ensure that a name can be physically cut with its respective holes and design, and that the strength and durability of the final cut name necklace may be preserved. This may be useful again with respect to an "Enlarging" section of a jewelry generating algorithm. A name may be redrawn when it exceeds the bounds made available to it in relation to a template nameplate source SVG file. This normally should not happen, except for in more extreme cases of longer and complex names (e.g., "Mohammed" vs. "Ashley"). The font size may be determined for each name necklace style. Some styles may only have certain fonts made available to it (e.g., for selection by a user via GUI 203), and these styles may also dictate a different font size for each font type. However, the same font file may be used for all styles regardless of size, as a font file (e.g., an SVG font file) may be scaled as desired.

A name redrawing algorithm of a jewelry generating algorithm of the JGSP (e.g., of application 223$a$ of subsystem 220) may include a draw next name operation loop or name drawing loop or Draw Next Name operation. Such an operation loop may be fired after a font has been ingested and optimized, and may be also called after any previous name for a jewelry item has been completed. This may mark the beginning of an iterative name drawing loop.

In this operation loop, various operations may be carried out. For example, the name may be split up into its individual letters as an array (e.g., Ashley may become ["A", "s", "h", "l", "e", "y" ]). In the case of special designs (e.g., Monogram designs), the second and third letter character codes may be remapped to special variants of the font's design. In the case of the "Hebrew" font, the letters may be reversed because right-to-left languages may be stored in computers as left-to-right, so they might be visually reversed for readability in its respective language. A hardcoded "Ashley" may be inserted just in case no name is specified when the name is crucial to the design of the name necklace (e.g., nameMode). The name path direction may be determined from the configuration and may then be used to determine the new order of what letters to draw. If the path direction is "left" (e.g., right-aligned text), then the name may be reversed (e.g., ["y", "e", "l", "h", "s", "A" ]). If the path direction is "right" (e.g., left-aligned text), then the name may remain as-is. If the path direction is "center", then the name may be shuffled so that the middle character may be drawn first, then the following characters in the rightwards direction, then the previous characters, reversed, in the leftwards direction. In the case of an even number of letters, the letter after the middle may be used, and in the case of an odd number of letters, the middle letter may be included in the tail portion (e.g., an odd number of letters for name "Ashley" may be shuffled and ordered as follows: "l", "e", "y", "h", "s", "A", and an even number of letters for name "Wendy" may be shuffled and ordered as follows: "n", "d", "y", "e", "W"). A beginning offset (e.g., startOffset) and current loop lineOffset may be started at 0. Then, a process may proceed to operation 2 (Draw Next Letter).

A name redrawing algorithm of a jewelry generating algorithm of the JGSP (e.g., of application 223a of subsystem 220) may include a Draw Next Letter operation loop or letter drawing loop for a current name. For example, this may include an importing operation for importing an SVG font file for the next relevant letter to be drawn, or importing the relevant letter using OpenType.js from a TTF font file (e.g., in scenarios when an SVG font file may not exist). One or more drawing operations may be carried out for drawing the imported letter (e.g., into a headless canvas). One or more resizing operations may be carried out for resizing the letter to the correct size as may be defined by the nameplate configuration nameFontSizes mapping (e.g., for a given font name and style code, a font size may be returned specific to that font name and style code). One or more populating operations may be carried out for populating any relevant left/right guides, cut guides or cut lines, eyelets, and/or any other suitable data into the data attribute(s) of the newly drawn letter for future reference (e.g., in a Position Letter operation). For example, an SVG file may be imported into a Javascript object for manipulation. While the guides/cut lines/eyelets may be accessible through a "children" method of this object, populating them directly into data attributes in a Javascript object may reduce some coding work. One or more determining operations may be carried out for determining an initial centerOffset from where the first letter may be drawn. For example, left-direction paths may have a centerOffset of the rightmost point of the name path, minus half the width of the current letter itself, and also minus any current offset in the line from previous letter draws. Additionally or alternatively, right-direction paths may have a centerOffset of the leftmost point of the name path, plus half the width of the current letter itself, and also plus any current offset in the line from previous letter draws. Additionally or alternatively, center-direction paths may have a centerOffset of the halfway point of the name path, plus or minus half of the width of the current letter itself, and also plus/minus the current offset in the line from previous letter draws in the current half portion. These variables may be an approximation. If the name is determined to be out of bounds for any reason, the starting position may be slightly adjusted and the name may be redrawn. One or more defining operations may be carried out for defining initial variables to be stored between each Position Letter operation, including, but not limited to, one, some, or each of the following:

var lastRotation=null;
    var lastPathPoint=null;
    var start=true;
    var restart=false;
    varfailOut=false;
    var kernOut=false;
    var tPoint=0; and
    var step=1.32, where lastRotation may be indicative of the last amount of rotation that was applied to the currently drawn letter (e.g., this may be used to rotate the letter back to a "straight-up" position when determined to not intersect with its previous letter), where lastPathPoint may be indicative of the last path point that was used as the axis of rotation and letter placement (e.g., an assistance variable for lastRotation), where start may indicate that the algorithm was just started (e.g., for the while loop to check), while restart may indicate that the algorithm needs to start over (e.g., for the while loop to check), while failOut may indicate that the letter could not be drawn and so a failOut is thrown (e.g., for the while loop to check), while kernOut may indicate that the algorithm has successfully finished and it can now "kern" the letter by a set amount of kerning that may be provided, while tPoint may indicate the current point along the curve that the letter was drawn on, while step may be indicative of the amount of distance to move along the name curve when an intersection has not yet been determined, and/or the like, after which a Position Letter operation may begin.

A name redrawing algorithm of a jewelry generating algorithm of the JGSP (e.g., of application 223a of subsystem 220) may include a letter positioning algorithm or letter positioning operation loop or Position Letter operation for positioning a current letter. For example, this may include getting a reference to the previous letter in prevLetter. All references to a curve may indicate the name curve coming from a source SVG file, which may be defined by a designer, which may or may not be created or devised by the algorithm. For example, a while loop may begin, which may have one, some, or each of the following conditions:

start is true OR
    restart is true OR
    failOut is false AND
        There is no previous letter and there is no kerning out (e.g., kernOut is false) OR
        There is a previous letter AND
            kernOut is false OR
                In the scenario of a left-direction draw or the loop is currently handling the last half of a center-aligned name, the previous letter's left guide DOES NOT intersect with the current letter's right guide
                In the scenario of a right-direction draw or the loop is currently handling the first half of a center-aligned name, the previous letter's right guide DOES NOT intersect with the current letter's left guide.

The operations of such a while loop may be as follows:
    If the loop is not in start or restart mode, and:
        In left-direction draw or last half of center-aligned name, the previous letter's left guide may intersect with the current letter's right guide
        In right-direction draw or first half of center-aligned name, the current letter's right guide may intersect with the current letter's left guide
    Then the loop may enter kernOut=true mode.
    Otherwise, the loop may determine the new internalOffset as follows:
        If the loop is currently testing positions in the LEFT direction, then the loop may subtract a step from the current internalOffset (e.g., to go "left" on the perceived horizontal portion of the curve)

If the loop is currently testing positions in the RIGHT direction, then the loop may add a step from the current internalOffset (e.g., to go "right" on the perceived horizontal portion of the curve)

If the loop is starting fresh, then:
    For left-direction paths, the loop may set internalOffset to the positive value of step size
    For right-direction paths, the loop may set the internalOffset to the negative value of step size
    For center-aligned paths
        First half of the draw, positive value of step size
        Second half of the draw, negative value of step size Then for nameMode (e.g., horizontal name path necklaces), there may be a check to determine if the current letter has exceeded the x-axis position of the previous letter before it in whatever direction is desired.

If this check is true, the loop may check to see if it has already reduced the step size to the smaller step
    If this subsequent check is true, then the loop may have failed and failOut may be set to true as there may be nothing more that the algorithm can do to save the draw
    If this subsequent check is false, then the loop may set the step size to the smallerStep from this point forward and for any subsequent letters, and reset the internalOffset to 0 for repositioning. Then a new Position Letter operation may be called.

Next, a check may be made to determine if the internalOffset plus the centerOffset has exceeded the available leftwards room on the name path curve
    If this is true, then the loop may reset the internalOffset and centerOffset both to 0 to try and draw from the right side of the name path towards the left again.

Another check may be for kernOut:
    If true, the tPoint (e.g., the ultimate point to draw the next letter position on) may be set to the current centerOffset plus internalOffset, and/or plus/minus another step for good measure.
    If false, tPoint may be simply the currentOffset plus internalOffset pathPoint may then be calculated (e.g., by using a PaperJS's getPointAt(tpoint) function) to get the exact point found on the curve based on the tPoint offset. This may be the exact point derived from the curve (e.g., the tPoint+the name curve=an exact x,y position). It may be used to place the letter and then base the rotation using the tangent at that point on the curve.

If no pathPoint is found based on this lookup, the loop may reset the step size to a smallerStep and restart the positioning to the left or rightmost position on the name curve depending on the desired direction to draw the name path on.

A check may be made to see if the loop previously rotated the letter
    If it has been rotated, it may be reversed back to stand straight again Then the letter may be positioned along the curve in a "standing straight" position in preparation for its rotation The tangent may be derived from the pathPoint on the curve, and the rotation may be derived from the angle of this tangent in relation to the x-axis.

Then the letter (e.g., and all of its relevant guides, eyelets, etc.) may be rotated along the pathPoint so that they may lie in tangent to the name curve at the pathPoint The "connectedness" may be determined within the next iteration of the while-loop, with the conditions mentioned at the very beginning of this loop. If the conditions are satisfied, the loop may be finished.

Figure 10:
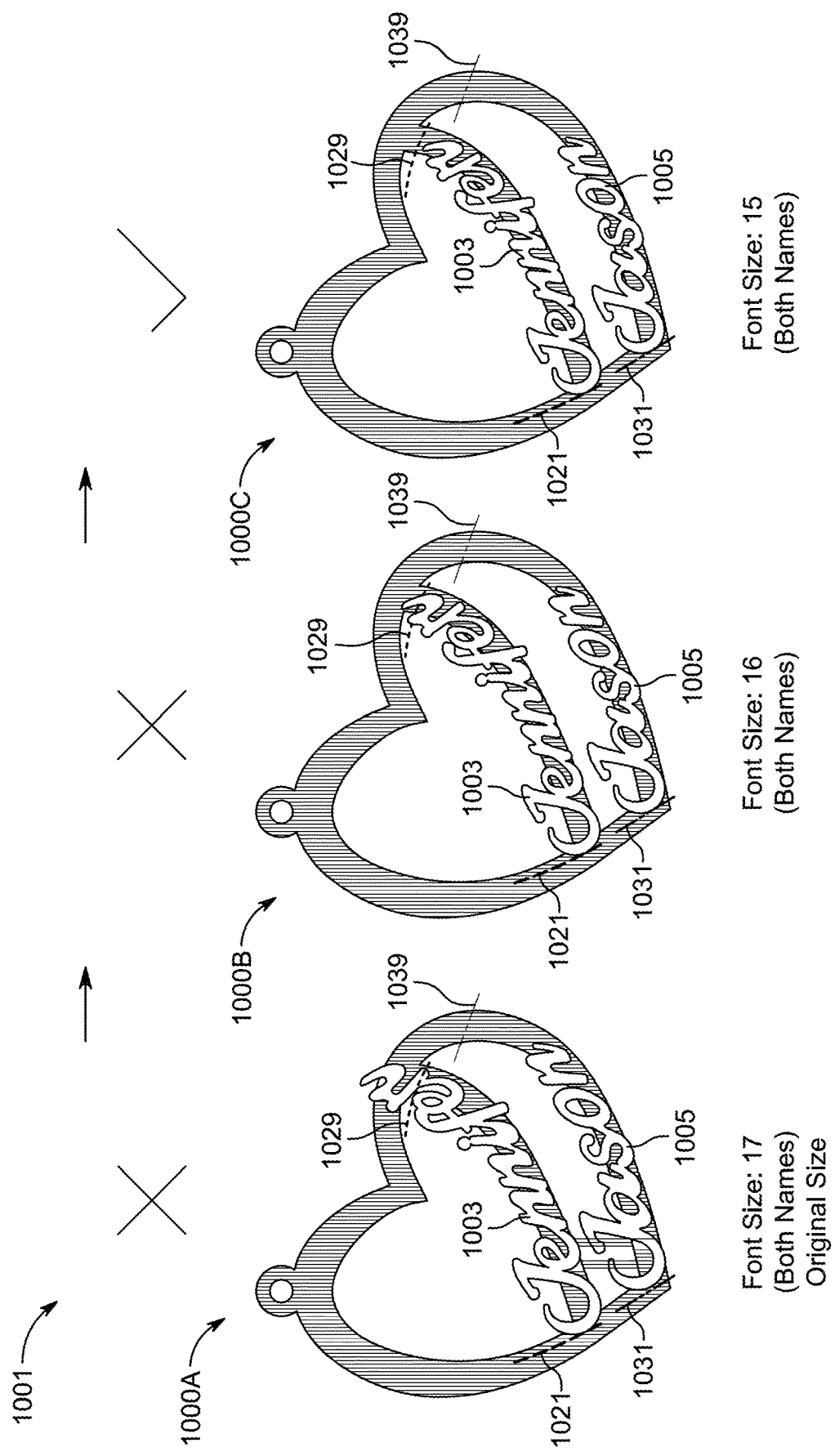
FIG. 10 illustrates a development progression of yet another jewelry item.

Now that a letter has been drawn to a good degree of satisfaction, the finished letter may be checked against the left bounds and right bounds of the name path (e.g., if they exist). A name path can have what may be called "left bounds" or "right bounds", which may be a curve that describes an area that the name ought or might never go beyond or exceed. If the name intersects with either of these bounds, the name may be adjusted, sized down, or both. For example, if the letter intersects with either bound, any of the following may occur. If a name is exceeding the direction the name is drawing and is not being drawn in the "center" mode, then the overall font size may be adjusted down and a Redraw operation may be called. For example, as shown in FIG. 10, a nameplate development progression 1001 may include a progression from a nameplate configuration 1000A (e.g., an SVG customized jewelry item of a customized jewelry item SVG file for a particular "written with love heart name necklace" type nameplate with one or more customized variables (e.g., two customized names)) to a nameplate configuration 1000B (e.g., an SVG customized jewelry item of a customized jewelry item SVG file for a particular "written with love heart name necklace" type nameplate with one or more customized variables (e.g., two customized names (e.g., as may be updated from configuration 1000A with an adjusted font size for at least one of the names))) to a nameplate configuration 1000C (e.g., an SVG customized jewelry item of a customized jewelry item SVG file for a particular "written with love heart name necklace" type nameplate with one or more customized variables (e.g., two customized names (e.g., as may be updated from configuration 1000B with a further adjusted font size for at least one of the names))). For example, an e1-left-bound portion 1021 of a nameplate 1000 of FIG. 10 may be a bound that may attempt to ensure that no letter of a first name (e.g., Generated Name 1 object portion 1003: "Jennifer") may extend to the left beyond that bound, while an e1-right-bound portion 1029 of a nameplate 1000 of FIG. 10 may be a bound that may attempt to ensure that no letter of the first name (e.g., Generated Name 1 object portion 1003: "Jennifer") may extend to the right beyond that bound, while an e2-left-bound portion 1031 of nameplate 1000 of FIG. 10 may be a bound that may attempt to ensure that no letter of a second name (e.g., Generated Name 2 object portion 1005: "Jason") may extend to the left beyond that bound, while an e2-right-bound portion 1039 of nameplate 1000 of FIG. 10 may be a bound that may attempt to ensure that no letter of the second name (e.g., Generated Name 2 object portion 1005: "Jason") may extend to the right beyond that bound. The bounds may be optional, but may ensure that letters of a name never go beyond certain points. As shown, when at least one letter of a name intersects with a bound by exceeding the direction the name is drawing and is not being drawn in the "center" mode (e.g., when the letter "r" of "Jennifer" when aligned left intersects with e1-right-bound portion 1029), then the overall font size may be adjusted down (e.g., from a font size 17 of configuration 1000A to a font size 16 of configuration 1000B) and a Redraw operation may be called (e.g., where the font size of each name or at least the name "Jennifer" may be downsized to the next smallest font size). This may be repeated until no letter is intersecting a bound (e.g., from a font size 16 of configuration 1000B to a font size 15 of configuration 1000C).

Figure 11:
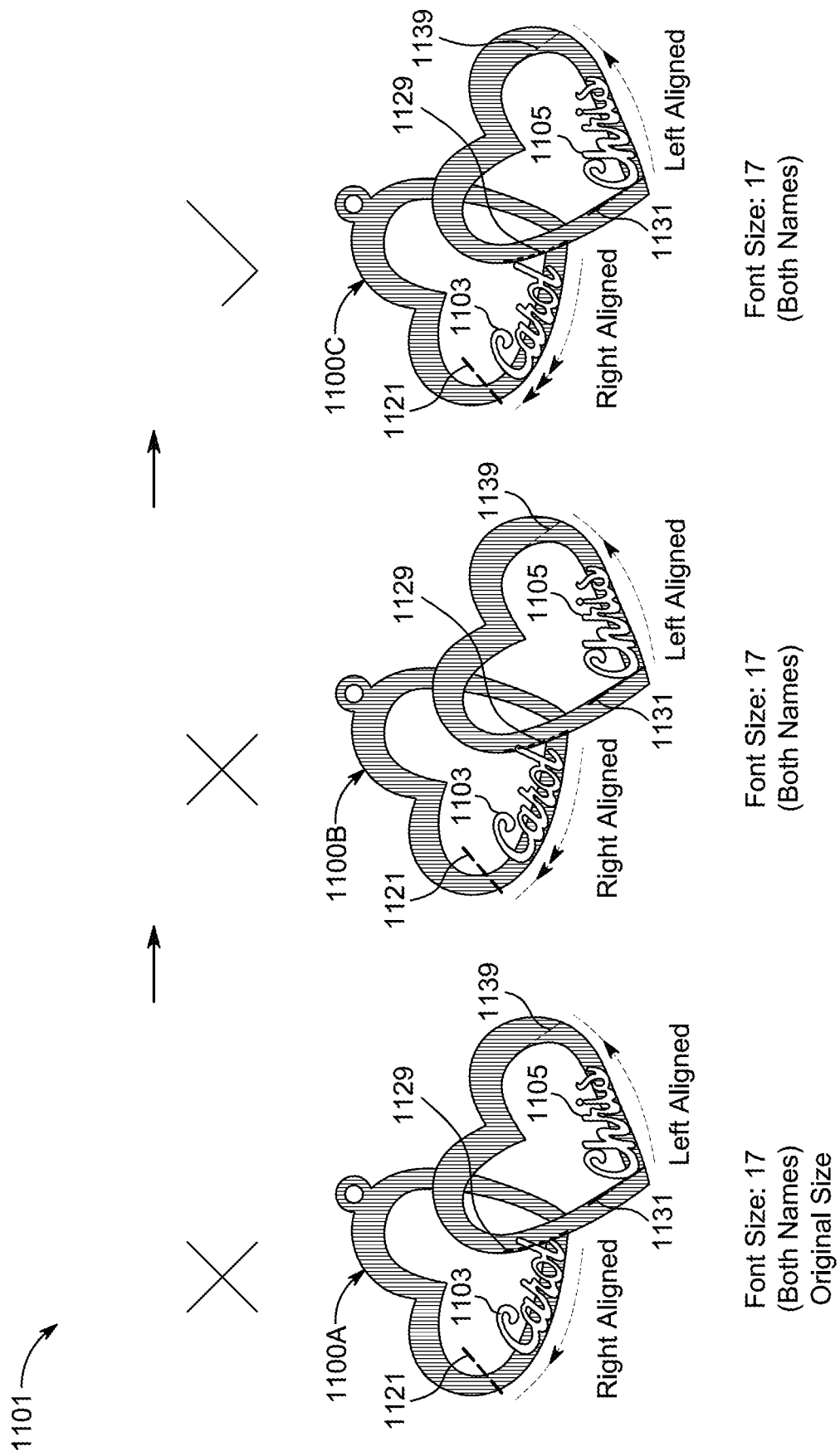
FIG. 11 illustrates a development progression of yet another jewelry item.

If a name is exceeding a bound in the opposite direction the name is drawing and is not being drawn in the "center" mode, then the letter may be considered not to have been drawn far out enough and the padding of the name path may be adjusted so that the first letter may appear further into the name path and the Redraw operation may be then called. For example, as shown in FIG. 11, a nameplate development progression 1101 may include a progression from a nameplate configuration 1100A (e.g., an SVG customized jewelry item of a customized jewelry item SVG file for a particular "interlocked in love heart name necklace" type nameplate with one or more customized variables (e.g., two customized names)) to a nameplate configuration 1100B (e.g., an SVG customized jewelry item of a customized jewelry item SVG file for a particular "interlocked in love heart name necklace" type nameplate with one or more customized variables (e.g., two customized names (e.g., as may be updated from configuration 1100A with an adjusted padding for at least one of the names))) to a nameplate configuration 1100C (e.g., an SVG customized jewelry item of a customized jewelry item SVG file for a particular "interlocked in love heart name necklace" type nameplate with one or more customized variables (e.g., two customized names (e.g., as may be updated from configuration 1100B with a further adjusted padding for at least one of the names))). For example, an e1-left-bound portion 1121 of a nameplate 1100 of FIG. 11 may be a bound that may attempt to ensure that no letter of a first name (e.g., Generated Name 1 object portion 1103: "Carol") may extend to the left beyond that bound, while an e1-right-bound portion 1129 of a nameplate 1100 of FIG. 11 may be a bound that may attempt to ensure that no letter of the first name (e.g., Generated Name 1 object portion 1103: "Carol") may extend to the right beyond that bound, while an e2-left-bound portion 1131 of nameplate 1100 of FIG. 11 may be a bound that may attempt to ensure that no letter of a second name (e.g., Generated Name 2 object portion 1105: "Chris") may extend to the left beyond that bound, while an e2-right-bound portion 1139 of nameplate 1100 of FIG. 11 may be a bound that may attempt to ensure that no letter of the second name (e.g., Generated Name 2 object portion 1105: "Chris") may extend to the right beyond that bound. The bounds may be optional, but may ensure that letters of a name never go beyond certain points. As shown, when at least one letter of a name (e.g., the letter "l" of "Carol") when right aligned intersects with e1-right-bound portion 1129 (e.g., by exceeding in the opposite direction the name is drawing and is not being drawn in the "center" mode), then the letter may be considered not to have been drawn far out enough and padding of the name path may be adjusted so that the last letter may appear further into the name path (e.g., from configuration 1100A to configuration 1100B) and a Redraw operation may be called (e.g., where the padding may be adjusted (e.g., increased (e.g., spacing between e1-right-bound portion 1129 and the letter "l" in "Carol" may be increased by a step)). This may be repeated until no letter is intersecting a bound (e.g., from configuration 1100B to configuration 1100C (e.g., by further increasing the padding)).

If a name is exceeding a bound in either direction and is being drawn in the "center" mode, then a new drawing direction of left or right may begin and the Redraw operation may be called. As shown in FIG. 12, for example, when at least one letter of a name (e.g., the letter "J" of "Jullian") when center aligned intersects with e2-left-bound portion 1231 (e.g., by exceeding the bound in any direction and the name is being drawn in the "center" mode), then a new drawing direction of left or right may begin so that the letter may appear further into the name path (e.g., from configuration 1200A to configuration 1200B) and a Redraw operation may be called (e.g., where the alignment of the name may be adjusted (e.g., the alignment of the name "Jullian" may be adjusted from a center alignment to a right alignment (e.g., such that a spacing may be provided between e1-left-bound portion 1231 and the letter "J" in "Jullian" may be provided) while the alignment of any other names (e.g., Jess) may not be adjusted)).

Figure 13:
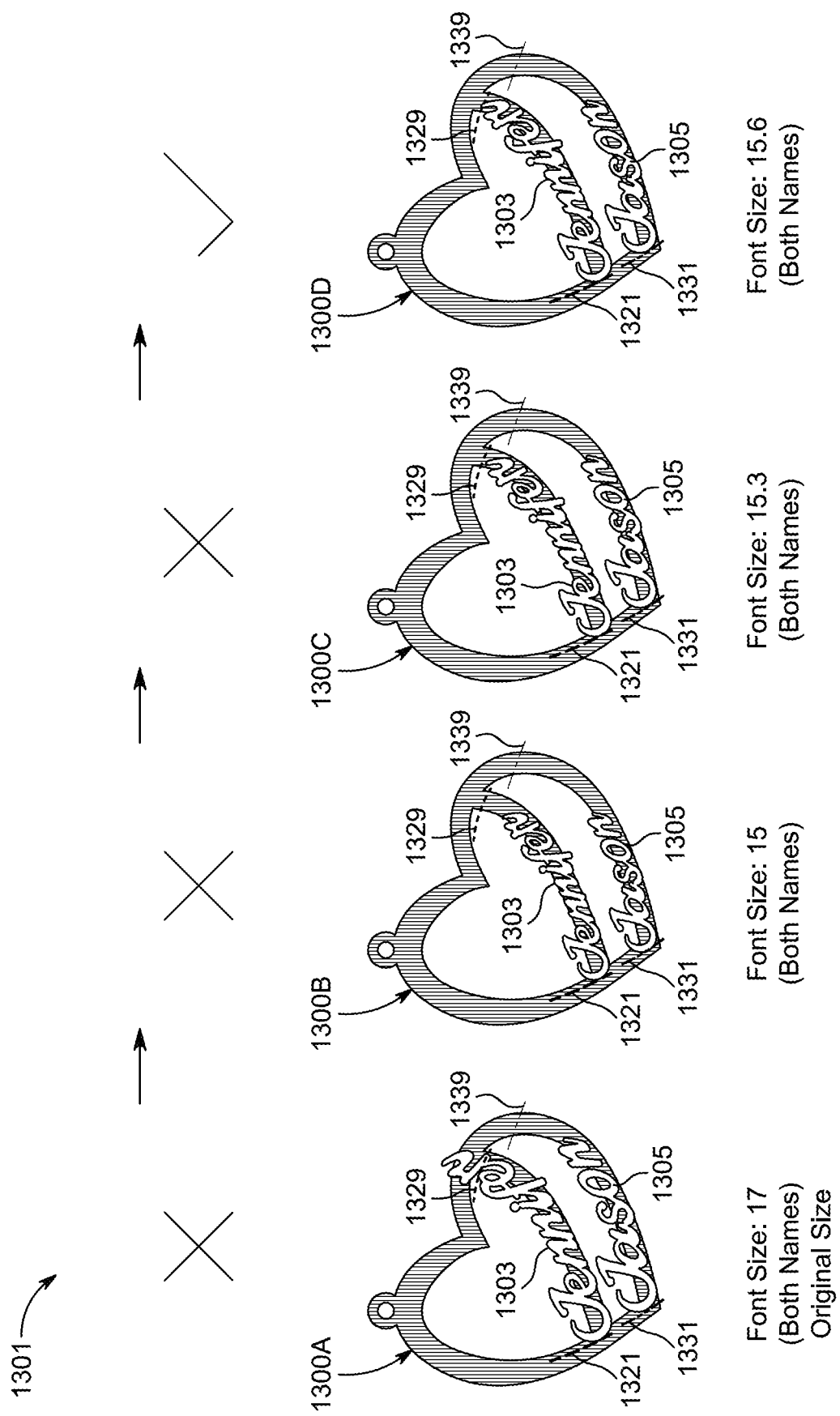
FIG. 13 illustrates a development progression of yet another jewelry item.

If a name was previously downsized, then the name may be slowly upsized and then adjusted and/or padded through various Redraw Name operations until the letters of the name may barely touch both the left and right guides to ensure that the largest possible font size may be used. For example, as shown in FIG. 13, a nameplate development progression 1301 may include a progression from a nameplate configuration 1300A (e.g., an SVG customized jewelry item of a customized jewelry item SVG file for a particular "written with love heart name necklace" type nameplate with one or more customized variables (e.g., two customized names)) to a nameplate configuration 1300B (e.g., an SVG customized jewelry item of a customized jewelry item SVG file for a particular "written with love heart name necklace" type nameplate with one or more customized variables (e.g., two customized names (e.g., as may be updated from configuration 1300A with an adjusted font size for at least one of the names))) to a nameplate configuration 1300C (e.g., an SVG customized jewelry item of a customized jewelry item SVG file for a particular "written with love heart name necklace" type nameplate with one or more customized variables (e.g., two customized names (e.g., as may be updated from configuration 1300B with a further adjusted font size for at least one of the names))) to a nameplate configuration 1300D (e.g., an SVG customized jewelry item of a customized jewelry item SVG file for a particular "written with love heart name necklace" type nameplate with one or more customized variables (e.g., two customized names (e.g., as may be updated from configuration 1300C with a further adjusted font size for at least one of the names))). For example, an e1-left-bound portion 1321 of a nameplate 1300 of FIG. 13 may be a bound that may attempt to ensure that no letter of a first name (e.g., Generated Name 1 object portion 1303: "Jennifer") may extend to the left beyond that bound, while an e1-right-bound portion 1329 of a nameplate 1300 of FIG. 13 may be a bound that may attempt to ensure that no letter of the first name (e.g., Generated Name 1 object portion 1303: "Jennifer") may extend to the right beyond that bound, while an e2-left-bound portion 1331 of nameplate 1300 of FIG. 13 may be a bound that may attempt to ensure that no letter of a second name (e.g., Generated Name 2 object portion 1305: "Jason") may extend to the left beyond that bound, while an e2-right-bound portion 1339 of nameplate 1300 of FIG. 13 may be a bound that may attempt to ensure that no letter of the second name (e.g., Generated Name 2 object portion 1305: "Jason") may extend to the right beyond that bound. The bounds may be optional, but may ensure that letters of a name never go beyond certain points. As shown, if a name is downsized to a smaller font size (e.g., when each one of names "Jennifer" and "Jason" are downsized from a font size 17 of configuration 1300A to a font size 15 of configuration 1300B (e.g., as described above with respect to configurations 1000A and 1000C), then the name may be slowly upsized and then adjusted and/or padded through various Redraw Name operations until the letters of the name may barely touch both the left and right guides to ensure that the largest possible font size may be used (e.g., the font may be upsized from font size 15 of configuration 1300B to font size 15.3 of configuration 1300C and then the font may be upsized from font size 15.3 of configuration 1300C to font size 15.6 of configuration 1300D).

Figure 14:
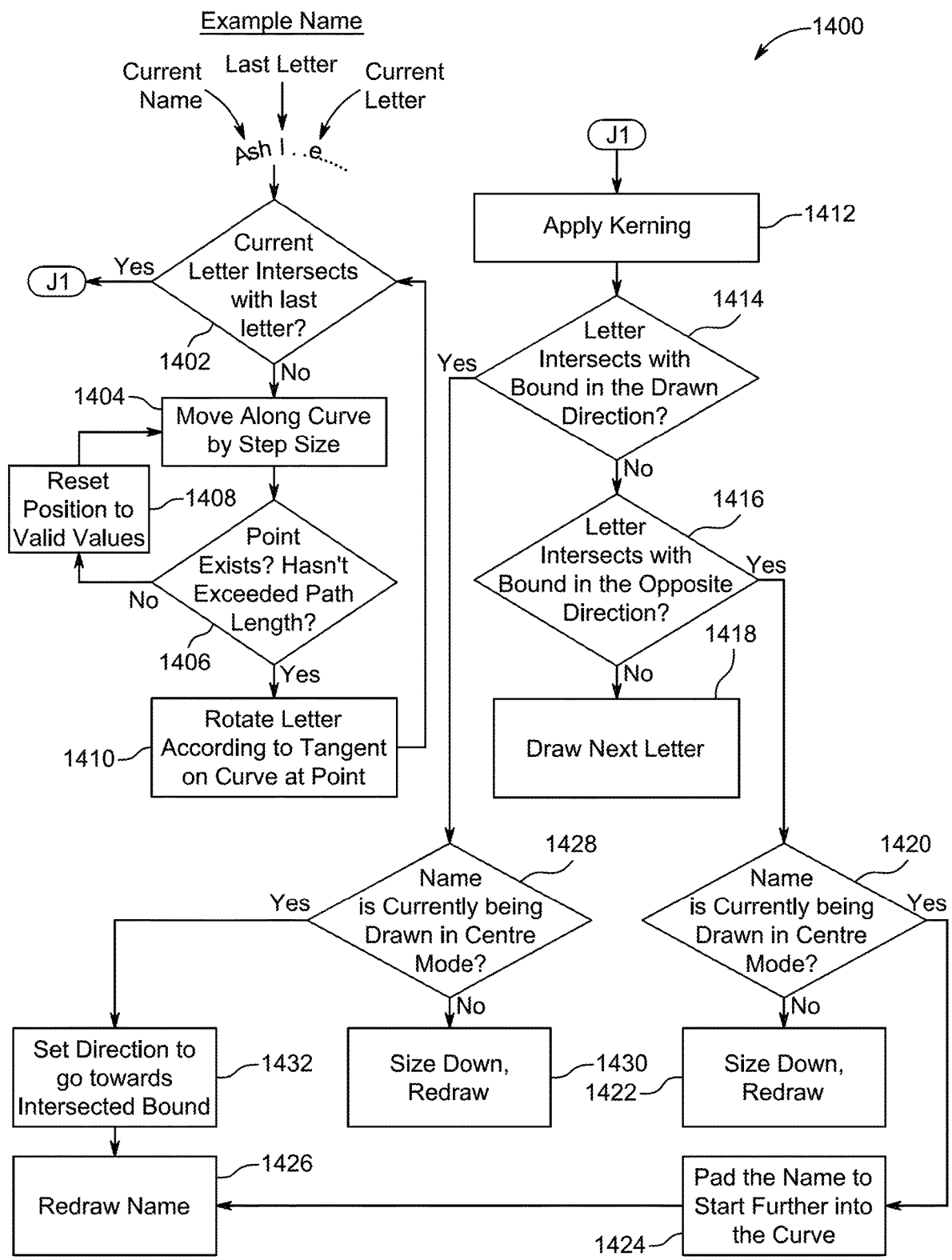
FIGS. 14 and 15 are flowcharts of illustrative processes for generating personalized jewelry items.

FIG. 14 is a flowchart of an illustrative process 1400 for positioning letters (e.g., in accordance with any suitable Position Letter operation(s) or algorithm(s) of a name redrawing algorithm of a jewelry generating algorithm of the JGSP (e.g., of application 223a of subsystem 220)). While describing process 1400, a particular example, as shown, may be referenced, in which, for a current name "Ashley" being drawn along a curve of a baseline, where the "A" and "s" and "h" and "l" have been positioned, and where "l" is the last letter positioned, and where "e" is the current letter being positioned. At operation 1402, it may be determined whether or not the current letter intersects with the last letter. If it is determined at operation 1402 that the current letter at a position along the curve does not intersect with the last letter, then process 1400 may advance to operation 1404, at which the position along the curve may be moved by a current step size to a new current position, and, then, at operation 1406, it may be determined whether or not a point exists along the curve at that new current position exists and doesn't exceed a path length. If it is determined at operation 1406 that a point does not exist along the curve at that new current position and/or exceeds a path length, then process 1400 may advance to operation 1408, at which a position may be reset to valid value(s), and then process 1400 may return to an earlier operation (e.g., to operation 1404). However, if it is determined at operation 1406 that a point does exist along the curve at that new current position and/or does not exceed a path length, then process 1400 may advance to operation 1410m at which the current letter may be rotated according to the tangent on the curve at that point, and then process 1400 may return to an earlier operation (e.g., to operation 1402). If it is determined at operation 1402 that the current letter at a position along the curve does intersect with the last letter, then process 1400 may advance to operation 1412, at which kerning may be applied to the current letter. Then, process 1400 may advance from operation 1412 to operation 1414, at which it may be determined whether or not the current letter intersects with the bound in the drawn direction. If it is determined at operation 1414 that the current letter does not intersect with the bound in the drawn direction, then process 1400 may advance to operation 1416, at which it may be determined whether or not the current letter intersects with the bound in the direction opposite to the drawn direction. If it is determined at operation 1416 that the current letter does not intersect with the bound in the direction opposite to the drawn direction, then process 1400 may advance to operation 1418, at which the next letter may be drawn as the current letter (e.g., the letter "y" may be the new current letter to be positioned (e.g., process 1400 may undertake a new iteration starting again at operation 1402 for the new current letter)). However, if it is determined at operation 1416 that the current letter does intersect with the bound in the direction opposite to the drawn direction, then process 1400 may advance to operation 1420, at which it may be determined whether or not the name is currently being drawn in a center mode. If it is determined at operation 1420 that the name is not currently being drawn in a center mode, then process 1400 may advance to operation 1422, at which the overall font size for the name may be adjusted down (e.g., by a current step size) and the name may be redrawn. However, if it is determined at operation 1420 that the name is currently being drawn in a center mode, then process 1400 may advance to operation 1424, at which the name may be padded to start further into the curve, after which process 1400 may advance to operation 1426, at which the name may be redrawn. If it is determined at operation 1414 that the current letter does intersect with the bound in the drawn direction, then process 1400 may advance to operation 1428, at which it may be determined whether or not the name is currently being drawn in a center mode. If it is determined at operation 1428 that the name is not currently being drawn in a center mode, then process 1400 may advance to operation 1430, at which the overall font size for the name may be adjusted down (e.g., by a current step size) and the name may be redrawn. However, if it is determined at operation 1428 that the name is currently being drawn in a center mode, then process 1400 may advance to operation 1432, at which the direction may be set to go towards the intersected bound (e.g., the bound determined at operation 1414 to be intersected), after which process 1400 may advance to operation 1426, at which the name may be redrawn.

It is understood that the operations shown in process 1400 of FIG. 14 are only illustrative and that existing operations may be modified or omitted, additional operations may be added, and the order of certain operations may be altered.

If there are no more letters to draw and the algorithm is in nameMode, then the eyelets may be repositioned around the name using the given eyelet paths included in the first and last letters provided for the name. If there are no more letters to draw for the name and there is another name to draw, then the Draw Next Name operation may be invoked. If there is another letter to draw in the name, then the Draw Next Letter operation may be invoked. Finally, if there are no more letters to draw for the name and there are no more names to draw, then a Finish Names operation may be invoked.

A name redrawing algorithm of a jewelry generating algorithm of the JGSP (e.g., of application 223a of subsystem 220) may include any suitable name finishing operations or Finish Names operations or algorithms. For example, if a name font was downsized at any point, an entire nameplate may be enlarged by the percentage of downsizing against the originally defined font size (e.g., as may be found in the nameFontSizes configuration file). This may be to ensure that the font may remain in its original size, because, if the font is sized down by any amount, the name necklace integrity may become compromised. In order to prevent extreme scenarios where the name necklace may be enlarged by too much, the enlargement may be limited to 10% or any other suitable threshold (e.g., without a warning to a factory operator who may be utilized for preparing such a name necklace for cutting).

Additionally or alternative, various left/right guides, extraneous eyelet data, baselines, and/or other data may be removed from all of the letters. The only guides that remain may be the left and right cut guides for each name for the "Divide" step found later in the Name Necklace Preparation.

Additionally or alternative, a filigree may be defined as any decorative elements that may appear above, below, or beside a drawn name necklace in nameMode. A visual example of this filigree may be found at GUI 203 of screen 500A of FIG. 5A, which may, for example, be provided for any suitable URL 541a (e.g., a URL of https://www.jewlr.com/products/JWLN0325/stylized-name-necklace). In this particular design, one may select the filigree (e.g., style: heart), however some other style codes can have a single filigree instead. The filigree designs may be stored with the source SVG file of the name necklace in a "fills" group under a "guides" group. In order to maintain a best appearance, the filigree may come in several different sizes and may be denoted by the group named "fill-filigreeName-N" where "filigreeName" may be the name of the selected filigree and "N" may be the filigree number of one of several variants. Inside of the filigree group, several different types of elements may exist. For example, one or more fixed elements may exist, where these may be elements of the filigree that may never be resized but may maintain their relative position based on the guideline lengthening or shortening. Additionally or alternatively, a guideline element may exist, where this element may always exist and may be matched up to the approximate resulting length of the name. When the guideline is translated on the x/y axis to match it up with the baseline of the name, the overall filigree may also be translated. If the guideline is longer than the approximate name length, the scaled filigree elements may be scaled down based on the percentage that the guideline may be larger by. The inverse may be true for if the guideline may be shorter than the approximate name length. Additionally or alternatively, one or more scaled elements may exist, where these may be elements of the filigree that may be always resized horizontally to match the name it appears around. Additionally or alternatively, one or more override eyelets may exist, where these may be eyelets that may be part of the filigree instead of from the name itself. Sometimes the filigree may be placed in such a way that the chain may attach to it instead of the eyelets that normally come on the name. In this case, the eyelets from the filigree may be used to determine placement instead of the usual methods from the font characteristics.

Additionally or alternative, a charm eye may be defined as an eyelet that may be placed on the bottom of the name necklace design. An example of this may be found at GUI 203 of screen 500B of FIG. 5B, which may, for example, be provided for any suitable URL 541*b* (e.g., a URL of https://www.jewlr.com/products/JWLN300/personalized-name-necklace?a1=Butterfly). When the nameMode is false, the charm eyelet may not move and may be instead integrated with the source SVG. However, when nameMode is true, the charm eyelet may need to be positioned correctly such that the eyelet may be integrated into the name correctly. This may mark the entry point of the charm eye placement algorithm. An eyelet may be composed of two paths: one outer circle and one inner circle which may describe the "hole" in the eyelet. As the goal may be to have the "hole" barely touch the edge of a letter to maintain a uniform appearance, the algorithm may be checking on intersections between the hole and the letters. Moving forward, this "hole" may be referred to as the "inner eye". The charm eye placement algorithm may include a few variables that it may utilize in a loop, including, but not limited to:

lowestY: this may be a key attribute, where the bottom of the charm eyelet may not be allowed to go any higher than this horizontal axis because the charm eyelet would then be located in undesirable parts of the name that may make it impractical to attach a charm;
This value may be derived by taking all of the letters found in the middle of an assembled name (e.g., there may be multiple rather than just one), and determining its lowest point in its shape, such as the bottom of the letter "y" which can extend far below the baseline;
Process: this may be a flag that may ensure continuity with the algorithm loop (e.g., only iterates if this is true);

Retry: this may be a flag that may trigger a draw in the opposite direction when the eyelet is no longer in the canvas view;
finalTry: this may be a flag that may trigger one more draw in the upwards direction as a last resort;
Direction: this may be the current direction for placement of the eyelet. Possible values may be "up", "left", and "right", where the value may start with "up";
testPoint: this may be the current point to test the eyelet's position against in relation to the assembled name; and
stepSize: this may be the iteration step size for how far the eyelet position may be moved over each iteration. This may behave as a constant, and may be set to 0.2 at this time as an example.

The following are operations that may be carried out in a charm eye placement algorithm:
The charm eye placement algorithm may begin by placing the eyelet at lowestY in the middle of the name.
The charm eye placement algorithm then may try moving the eyelet slowly upwards by stepSize until either:
The inner eye intersects two or more middle letters
The charm eye placement algorithm may be complete if this condition is true
The inner eye intersects one middle letter at more than two points
The charm eye placement algorithm may be complete if this condition is true
The bottom of the charm eyelet is higher than lowestY
This attempt may be considered to have failed in the upwards direction, so the charm eye placement algorithm may continue to the next operation of the process
If the charm eye placement algorithm is still process=true:
For intersection on one letter: The charm eye placement algorithm may change the direction to "left" or "right" depending on which side the intersection has occurred—in order to obtain a better intersection
Once the eyelet has been shuffled far enough left/right to have two intersections, then the charm eye placement algorithm may be complete
For failure in the upwards direction: the charm eye placement algorithm may draw a horizontal line measuring the shortest distance from the eyelet to any intersecting letter
The charm eyelet may be then shuffled until the inner eye intersects one middle letter at more than two points
If the charm eyelet goes out of bounds beyond the canvas in either direction, then the "retry" flag may be thrown and the eyelet may be sent back in the opposite direction (e.g., "right" becomes "left")
If the charm eyelet goes out of bounds again after the retry flag has been thrown, then the finalTry flag may be set and the eyelet may be nudged upwards from the dead center and lowestY until any intersection may be found with the letters
This may be a failsafe and often does not happen For example, as described with respect to FIGS. 7-9F, a name necklace plate design may be divided with the appropriate first/last letters of each name and the cut guides may be incorporated with them. This may give a final appearance of a name necklace pattern/design integrated with the names themselves. At this point, the letters, necklace plate design, and the corresponding eyelets and features may be all separate from each other but may overlap for a subsequent merge operation, which may combine all such elements into a single design to be presented as a visual representation (e.g., as a visual representation portion of web data 206 and/or of a GUI 203) and/or to be manufactured as a physical representation (e.g., a customer's physically cut design 266). Then, any suitable chains, jump rings, charms, and/or the like may be added as appropriate to such a visual representation (e.g., by data 206 (e.g., for a preview mode)) and/or to such a physical representation (e.g., by machinery 260).

Figure 15:
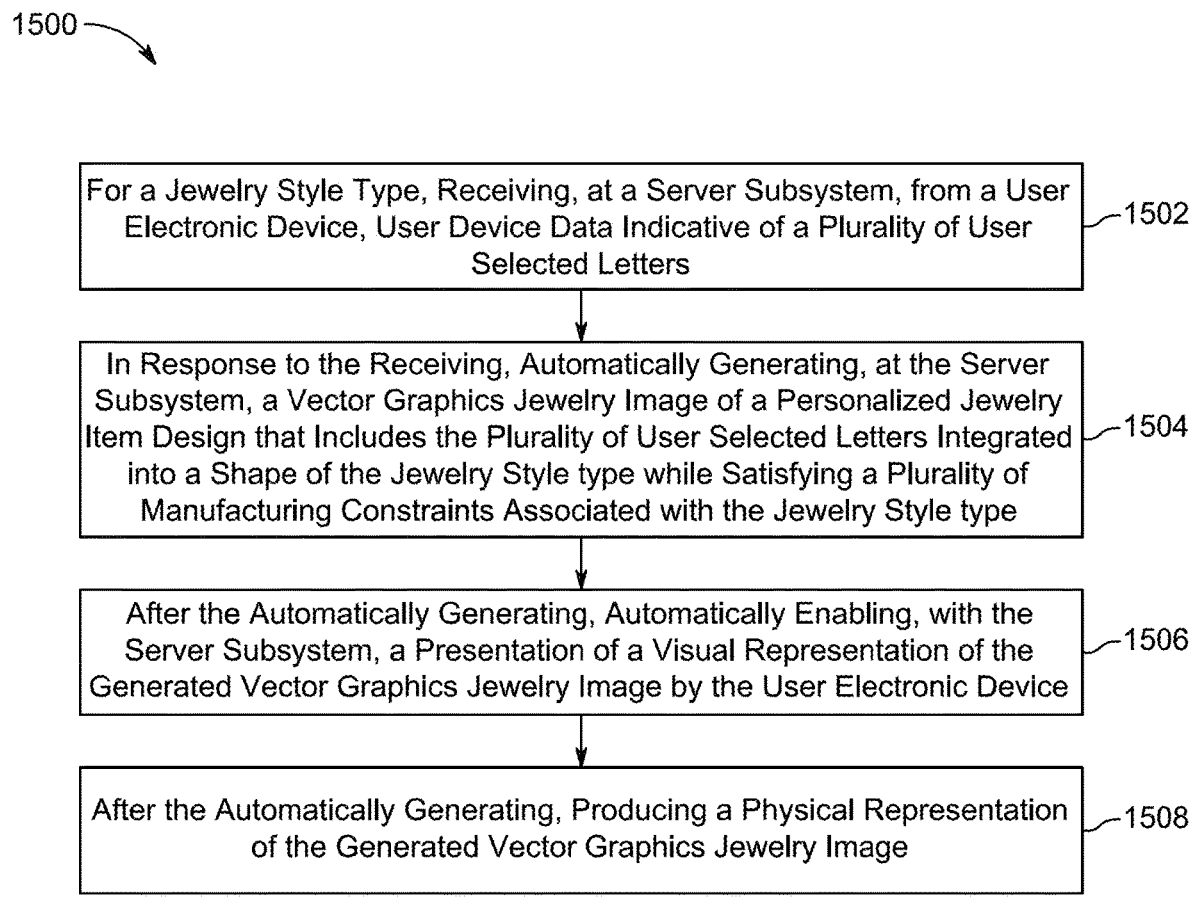

FIG. 15 is a flowchart of an illustrative process 1500 for generating a personalized jewelry item. At operation 1502 of process 1500, for a jewelry style type, user device data indicative of a plurality of user-selected letters may be received, at a server subsystem, from a user electronic device. At operation 1504 of process 1500, in response to the receiving of operation 1502, a vector graphics jewelry image of a personalized jewelry item design that includes the plurality of user-selected letters integrated into a shape of the jewelry style type while satisfying a plurality of manufacturing constraints associated with the jewelry style type may be automatically generated at the server subsystem. At operation 1506 of process 1500, after the automatically generating of operation 1504, a presentation of a visual representation of the generated vector graphics jewelry image by the user electronic device may be automatically enabled with the server subsystem. At operation 1508 of process 1500, after the automatically generating of operation 1504, a physical representation of the generated vector graphics jewelry image may be produced.

It is understood that the operations shown in process 1500 of FIG. 15 are only illustrative and that existing operations may be modified or omitted, additional operations may be added, and the order of certain operations may be altered.

One, some, or all of the processes described with respect to FIGS. 1-15 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., one or more memories and/or one or more data structures of one or devices, servers, computers, machines, or the like of FIG. 2). In other embodiments, the computer-readable medium may be a transitory computer-readable medium. In such embodiments, the transitory computer-readable medium can be distributed over network-coupled computer systems so that the computer-readable code may be stored and executed in a distributed fashion. For example, such a transitory computer-readable medium may be communicated from any one of the devices, servers, computers, machines, or the like of FIG. 2 to any other one of the devices, servers, computers, machines, or the like of FIG. 2 using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of the disclosure may be provided as a software construct, firmware construct, one or more hardware components, or a combination thereof. For example, any, each, or at least one module or component or subsystem of any one or more of the devices, servers, computers, machines, or the like of FIG. 2 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of any one or more of the devices, servers, computers, machines, or the like of FIG. 2 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

While there have been described systems, methods, and computer-readable media for a jewelry generation service, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Many alterations and modifications of the preferred embodiments will no doubt become apparent to a person of ordinary skill in the art after having read the foregoing description, it is to be understood that the particular embodiments shown and described by way of illustration are in no way intended to be considered limiting. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "up" and "down," "front" and "back," "left" and "right," "upper" and "lower," "top" and "bottom" and "side," "vertical" and "horizontal" and "diagonal," "length" and "width" and "thickness" and "diameter" and "cross-section" and "longitudinal," "X-" and "Y-" and "Z-," "previous" and "next," and/or the like, may be used herein only for convenience, and that no fixed or absolute directional or orientational limitations are intended by the use of these words. If reoriented, different directional or orientational terms may need to be used in their description, but that will not alter their fundamental nature as within the scope and spirit of the subject matter described herein in any way. Thus, references to the details of the described embodiments are not intended to limit their scope.

Therefore, those skilled in the art will appreciate that the concepts can be practiced by other than the described embodiments, which are presented for purposes of illustration rather than of limitation.

What is claimed is:

1. A method for generating a personalized jewelry item, the method comprising:

for a jewelry style type, receiving, at a server subsystem, from a user electronic device, user device data indicative of a plurality of user-selected letters;

in response to the receiving, automatically generating, at the server subsystem, a vector graphics jewelry image of a personalized jewelry item design that comprises the plurality of user-selected letters integrated into a shape of the jewelry style type while satisfying a plurality of manufacturing constraints associated with the jewelry style type;

after the automatically generating, automatically enabling, with the server subsystem, a presentation of a visual representation of the generated vector graphics jewelry image by the user electronic device; and after the automatically generating, producing a physical representation of the generated vector graphics jewelry image, wherein the producing comprises:
defining a tool path using the generated vector graphics jewelry image; and
cutting entirely through a piece of material using a laser cutter in accordance with the defined tool path.

2. The method of claim 1, wherein the enabling is nearly instantaneously after the receiving.

3. The method of claim 1, wherein the enabling is no more than 5 seconds after the receiving.

4. The method of claim 1, wherein the enabling is no more than 3 seconds after the receiving.

5. The method of claim 1, wherein the enabling is no more than 1 second after the receiving.

6. The method of claim 1, wherein a manufacturing constraint of the plurality of manufacturing constraints is satisfied when the personalized jewelry item design comprises a continuous surface.

7. The method of claim 1, wherein a manufacturing constraint of the plurality of manufacturing constraints is satisfied when the personalized jewelry item design comprises each one of the plurality of user-selected letters connected to one of a plate of the jewelry style type or another one of the plurality of user-selected letters by a connection of at least a minimum threshold size.

8. The method of claim 1, further comprising, prior to the generating, creating a font file with a vector graphics font image for each one of a plurality of letters, wherein each vector graphics font image comprises:
a letter object comprising a shape of the letter of the vector graphics font image;
a left guide within the letter object's shape; and
a right guide within the letter object's shape, wherein a manufacturing constraint of the plurality of manufacturing constraints is satisfied when the left guide of the vector graphics font image for a first letter of the plurality of user-selected letters is joined to the right guide of the vector graphics font image for a second letter of the plurality of user-selected letters.

9. The method of claim 1, further comprising,
prior to the generating, creating a font file with a vector graphics font image for each one of a plurality of letters, wherein each vector graphics font image comprises:
a letter object comprising a shape of the letter of the vector graphics font image;
a left guide within the letter object's shape; and a right guide within the letter object's shape, wherein:
the user-selected letters of the plurality of user-selected letters are arranged in an order forming a name; and
a manufacturing constraint of the plurality of manufacturing constraints is satisfied when the left guide of the vector graphics font image for each letter of the plurality of user-selected letters except for the first letter in the order is joined to the right guide of the vector graphics font image of any other letter of the plurality of user-selected letters except for the last letter in the order.

10. The method of claim 1, further comprising, prior to the generating, creating a font file with a vector graphics font image for each one of a plurality of letters, wherein each vector graphics font image comprises:
a letter object comprising a shape of the letter of the vector graphics font image; and
a cut guide partially within the letter object's shape, wherein:
the user-selected letters of the plurality of user-selected letters are arranged in an order forming a name; and
a manufacturing constraint of the plurality of manufacturing constraints is satisfied when the cut guide of the vector graphics font image for the first letter in the order intersects a plate of the jewelry style type.

11. The method of claim 10, wherein another manufacturing constraint of the plurality of manufacturing constraints is satisfied when the cut guide of the vector graphics font image for the last letter in the order intersects the plate of the jewelry style type.

12. The method of claim 1, further comprising, prior to the generating:
creating a font file with a vector graphics font image for each one of a plurality of letters, wherein each vector graphics font image comprises a letter object comprising a shape of the letter of the vector graphics font image; and
creating a plate file with a vector graphics plate image for a plate of the jewelry style type, wherein the vector graphics plate image comprises:
a shape of the plate;
a left bound within the shape of the plate; and
a right bound within the shape of the plate, wherein a manufacturing constraint of the plurality of manufacturing constraints is satisfied when no letter object for any vector graphics font image for any letter of the plurality of user-selected letters crosses the left bound.

13. The method of claim 12, wherein another manufacturing constraint of the plurality of manufacturing constraints is satisfied when no letter object for any vector graphics font image for any letter of the plurality of user-selected letters crosses the right bound.

14. The method of claim 1, further comprising, prior to the generating:
creating a font file with a vector graphics font image for each one of a plurality of letters, wherein each vector graphics font image comprises a letter object comprising a shape of the letter of the vector graphics font image; and
creating a plate file with a vector graphics plate image for a plate of the jewelry style type, wherein the vector graphics plate image comprises:
a shape of the plate;
a left bound within the shape of the plate; and
a right bound within the shape of the plate, wherein:
the user-selected letters of the plurality of user-selected letters are arranged in an order forming a name; and
a manufacturing constraint of the plurality of manufacturing constraints is satisfied when the letter object for the vector graphics font image for the first letter in the order of the plurality of user-selected letters is adjacent to but does not cross the left bound.

15. The method of claim 14, wherein another manufacturing constraint of the plurality of manufacturing constraints is satisfied when the letter object for the vector graphics font image for the last letter in the order of the plurality of user-selected letters is adjacent to but does not cross the right bound.

16. A non-transitory computer-readable storage medium storing at least one program, the at least one program comprising instructions, which when executed by at least one processor of a server subsystem, causes the server system to:
   create a font file with a vector graphics font image for each one of a plurality of letters, wherein each vector graphics font image comprises:
      a letter object comprising a shape of the letter of the vector graphics font image; and
      a cut guide comprising a first cut guide portion within the letter object's shape and a second cut guide portion outside the letter object's shape;
   for a jewelry style type, receive, at the server subsystem, from a user electronic device, user device data indicative of a plurality of user-selected letters, wherein the user-selected letters of the plurality of user-selected letters are arranged in an order;
   in response to receiving the user device data, automatically generate, at the server subsystem, a vector graphics jewelry image of a personalized jewelry item design that comprises the plurality of user-selected letters integrated into a shape of the jewelry style type while satisfying a plurality of manufacturing constraints associated with the jewelry style type, wherein a manufacturing constraint of the plurality of manufacturing constraints is satisfied when the cut guide of the vector graphics font image for the first letter in the order intersects a plate of the jewelry style type;
   after generating the vector graphics jewelry image, automatically enable, with the server subsystem, a presentation of a visual representation of the generated vector graphics jewelry image by the user electronic device; and
   after enabling the presentation, produce a physical representation of the generated vector graphics jewelry image.

17. A server system comprising:
   a memory;
   a communications component; and
   a processor communicatively coupled to the memory and the communications component, the processor configured to:
      create a font file with a vector graphics font image for each one of a plurality of letters, wherein each vector graphics font image comprises:
         a letter object comprising a shape of the letter of the vector graphics font image;
         a left guide within the letter object's shape; and
         a right guide within the letter object's shape;
      for a jewelry style type, receive, via the communications component, from a user electronic device, user device data indicative of a plurality of user-selected letters;
      in response to receiving the user device data, automatically generate a vector graphics jewelry image of a personalized jewelry item design that comprises the plurality of user-selected letters integrated into a shape of the jewelry style type while satisfying a plurality of manufacturing constraints associated with the jewelry style type, wherein a manufacturing constraint of the plurality of manufacturing constraints is satisfied when the right guide of the vector graphics font image for a first letter of the plurality of user-selected letters is joined to the left guide of the vector graphics font image for a second letter of the plurality of user-selected letters;
      after generating the vector graphics jewelry image, automatically enable a presentation of a visual representation of the generated vector graphics jewelry image by the user electronic device; and
      after enabling the presentation, produce a physical representation of the generated vector graphics jewelry image.

18. A method for generating a personalized item, the method comprising:
   for a style type, receiving, at a server subsystem, from a user electronic device, user device data indicative of a plurality of user-selected characters;
   in response to the receiving, automatically generating, at the server subsystem, a vector graphics image of a personalized item design that comprises the plurality of user-selected characters integrated into a shape of the style type while satisfying a plurality of manufacturing constraints, wherein a manufacturing constraint of the plurality of manufacturing constraints is satisfied when the personalized item design comprises each one of the plurality of user-selected characters connected by a connection of at least a minimum threshold size to another one of the plurality of user-selected characters;
   after the automatically generating, automatically enabling, with the server subsystem, a presentation of a visual representation of the generated vector graphics image by the user electronic device; and
   after the automatically generating, producing a physical representation of the generated vector graphics image.

19. The method of claim 18, wherein the producing comprises:
   defining a tool path using the generated vector graphics image; and
   cutting a piece of material using a cutter in accordance with the defined tool path.

20. The method of claim 18, wherein the vector graphics image of the personalized item design comprises the plurality of user-selected characters integrated along a baseline of the shape of the style type, wherein the baseline comprises at least one curved portion.

* * * * *